(12) United States Patent
Faulkner et al.

(10) Patent No.: US 10,996,839 B2
(45) Date of Patent: May 4, 2021

(54) PROVIDING CONSISTENT INTERACTION MODELS IN COMMUNICATION SESSIONS

(71) Applicant: MICROSOFT TECHNOLOGY LICENSING, LLC, Redmond, WA (US)

(72) Inventors: Jason Thomas Faulkner, Seattle, WA (US); Marek Cais, Prague (CZ)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/417,424

(22) Filed: May 20, 2019

(65) Prior Publication Data
US 2020/0371677 A1 Nov. 26, 2020

(51) Int. Cl.
G06F 3/0484 (2013.01)
G06F 3/0482 (2013.01)
G06F 3/14 (2006.01)
H04N 7/15 (2006.01)

(52) U.S. Cl.
CPC ........ G06F 3/04847 (2013.01); G06F 3/0482 (2013.01); G06F 3/14 (2013.01); G06F 2203/04803 (2013.01); H04N 7/15 (2013.01)

(58) Field of Classification Search
CPC .................................................. G06F 3/0484
USPC ......................................................... 715/753
See application file for complete search history.

(56) References Cited

U.S. PATENT DOCUMENTS 5,657,096 A 8/1997 Lukacs
7,287,054 B2 * 10/2007 Lee ...................... H04M 3/567
709/204
7,326,117 B1 * 2/2008 Best ........................ A63F 13/10
463/32
7,620,901 B2 * 11/2009 Carpenter ............... G06F 3/048
715/754
8,289,363 B2 10/2012 Buckler
9,756,286 B1 9/2017 Faulkner
(Continued)

OTHER PUBLICATIONS

"Fixing a participant (the lecturer) to always appear as "main speaker" (i.e., "video pinning")", Retrieved from: https://support.bluejeans.com/knowledge/pinning-lecturer, Retrieved Date: Feb. 25, 2019, 2 Pages.
"Gotomeeting Desktop App: Organizer Guide for Windows", Retrieved from: https://support.logmeininc.com/gotomeeting/organizer-user-guide, Retrieved Date: Feb. 25, 2019, 14 Pages.
(Continued)

Primary Examiner — Reza Nabi
(74) Attorney, Agent, or Firm — Newport IP, LLC; Scott Y Shigeta

(57) ABSTRACT

The techniques disclosed herein improve existing computing systems by providing consistent interaction models during communication sessions. A system configured according to the disclosure presented herein can improve user engagement during communication sessions and conserve computing resources by enabling users to define arrangements of display areas in a user interface (UI) for presenting content during a communication session and to utilize the same pre-defined arrangement during multiple communication sessions. The arrangement can be presented to all or some of the participants in a communication session. By providing a consistent arrangement of display areas that render content to participants in communication sessions, the participants can be more engaged and productive, thereby improving human-computer interaction and conserving computing resources.

13 Claims, 26 Drawing Sheets

(56) References Cited

U.S. PATENT DOCUMENTS

| | | | |
|---|---|---|---|
| 10,754,418 B1 | 8/2020 | Ruppert et al. | |
| 2001/0012025 A1* | 8/2001 | Wojaczynski | G06F 3/0485 715/856 |
| 2002/0065877 A1* | 5/2002 | Kowtko | G06F 16/972 709/203 |
| 2002/0065912 A1* | 5/2002 | Catchpole | G06F 16/954 709/224 |
| 2002/0138624 A1* | 9/2002 | Esenther | H04L 29/06 709/227 |
| 2003/0189597 A1* | 10/2003 | Anderson | G06F 3/0481 715/778 |
| 2003/0208535 A1* | 11/2003 | Appleman | G06F 16/986 709/203 |
| 2005/0015492 A1* | 1/2005 | Kumbalimutt | H04L 67/1025 709/226 |
| 2006/0129642 A1* | 6/2006 | Qian | G06F 16/954 709/205 |
| 2007/0106748 A1* | 5/2007 | Jakobsson | H04L 67/42 709/217 |
| 2008/0079801 A1 | 4/2008 | Eri | |
| 2008/0130525 A1 | 6/2008 | Jansen et al. | |
| 2010/0082746 A1* | 4/2010 | Ulrich | G06F 16/954 709/204 |
| 2010/0083135 A1* | 4/2010 | Zawacki | H04L 51/04 715/753 |
| 2012/0169838 A1 | 7/2012 | Sekine | |
| 2012/0182381 A1 | 7/2012 | Abate et al. | |
| 2013/0038490 A1 | 2/2013 | Garcia | |
| 2013/0047093 A1* | 2/2013 | Reuschel | G06F 3/04883 715/753 |
| 2013/0076591 A1* | 3/2013 | Sirpal | G06F 3/0346 345/1.3 |
| 2013/0093835 A1 | 4/2013 | Paithankar et al. | |
| 2013/0187861 A1* | 7/2013 | Lavallee | G06F 9/543 345/173 |
| 2013/0214996 A1* | 8/2013 | Reeves | G06F 3/04883 345/1.3 |
| 2013/0328762 A1 | 12/2013 | McCulloch et al. | |
| 2014/0063060 A1 | 3/2014 | Maciocci et al. | |
| 2014/0089831 A1* | 3/2014 | Kim | G06F 3/0486 715/769 |
| 2014/0089833 A1* | 3/2014 | Hwang | G06F 3/0488 715/769 |
| 2014/0237366 A1 | 8/2014 | Poulos et al. | |
| 2014/0282196 A1 | 9/2014 | Zhao et al. | |
| 2015/0146255 A1* | 5/2015 | Shintani | H04N 1/0092 358/1.15 |
| 2015/0200985 A1* | 7/2015 | Feldman | H04L 67/12 715/753 |
| 2015/0334313 A1 | 11/2015 | Chougle et al. | |
| 2016/0077585 A1 | 3/2016 | Mizuhara | |
| 2016/0085436 A1* | 3/2016 | Louch | G06F 3/04812 715/790 |
| 2016/0117861 A1 | 4/2016 | Liu et al. | |
| 2016/0334781 A1* | 11/2016 | Blank | G05B 23/0216 |
| 2017/0039770 A1 | 2/2017 | Lanier et al. | |
| 2017/0061691 A1 | 3/2017 | Scott et al. | |
| 2017/0160895 A1* | 6/2017 | Hu | G06F 3/04883 |
| 2017/0169043 A1* | 6/2017 | Kim | G06F 16/957 |
| 2017/0171261 A1 | 6/2017 | Smus | |
| 2018/0063206 A1 | 3/2018 | Faulkner et al. | |
| 2018/0070050 A1 | 3/2018 | Hansen | |
| 2018/0121214 A1 | 5/2018 | Faulkner et al. | |
| 2018/0176508 A1 | 6/2018 | Pell | |
| 2019/0187893 A1* | 6/2019 | Gan | G06F 3/0481 |
| 2019/0236842 A1 | 8/2019 | Bennett et al. | |
| 2019/0369836 A1 | 12/2019 | Faulkner et al. | |
| 2020/0371673 A1 | 11/2020 | Faulkner | |

OTHER PUBLICATIONS

"Layout options in the Active Meeting View", Retrieved from: https://support.bluejeans.com/knowledge/layout-options, Retrieved Date: Feb. 25, 2019, 3 Pages.

"Pin Video", Retrieved from: https://support.zoom.us/hc/en-us/articles/201362743, Retrieved Date: Feb. 25, 2019, 3 Pages.

"Using dual displays for Chromebox for meetings", Retrieved from: https://support.google.com/meethardware/answer/6072741?hl=en, Retrieved Date: Feb. 25, 2019, 2 Pages.

Spakov, et al., "Gaze-Based Selection of Standard-Size Menu Items", In Proceedings of 7th International Conference on Multimodal Interfaces, Oct. 4, 2005, 5 Pages.

"International Search Report and Written Opinion Issued in PCT Application No. PCT/US20/028018", dated Jul. 24, 2020, 17 Pages.

"International Search Report and Written Opinion Issued in PCT Application No. PCT/US2020/028582", dated Aug. 31, 2020, 21 Pages.

"Non Final Office Action Issued in U.S. Appl. No. 16/420,125", dated Nov. 27, 2020, 23 Pages.

* cited by examiner

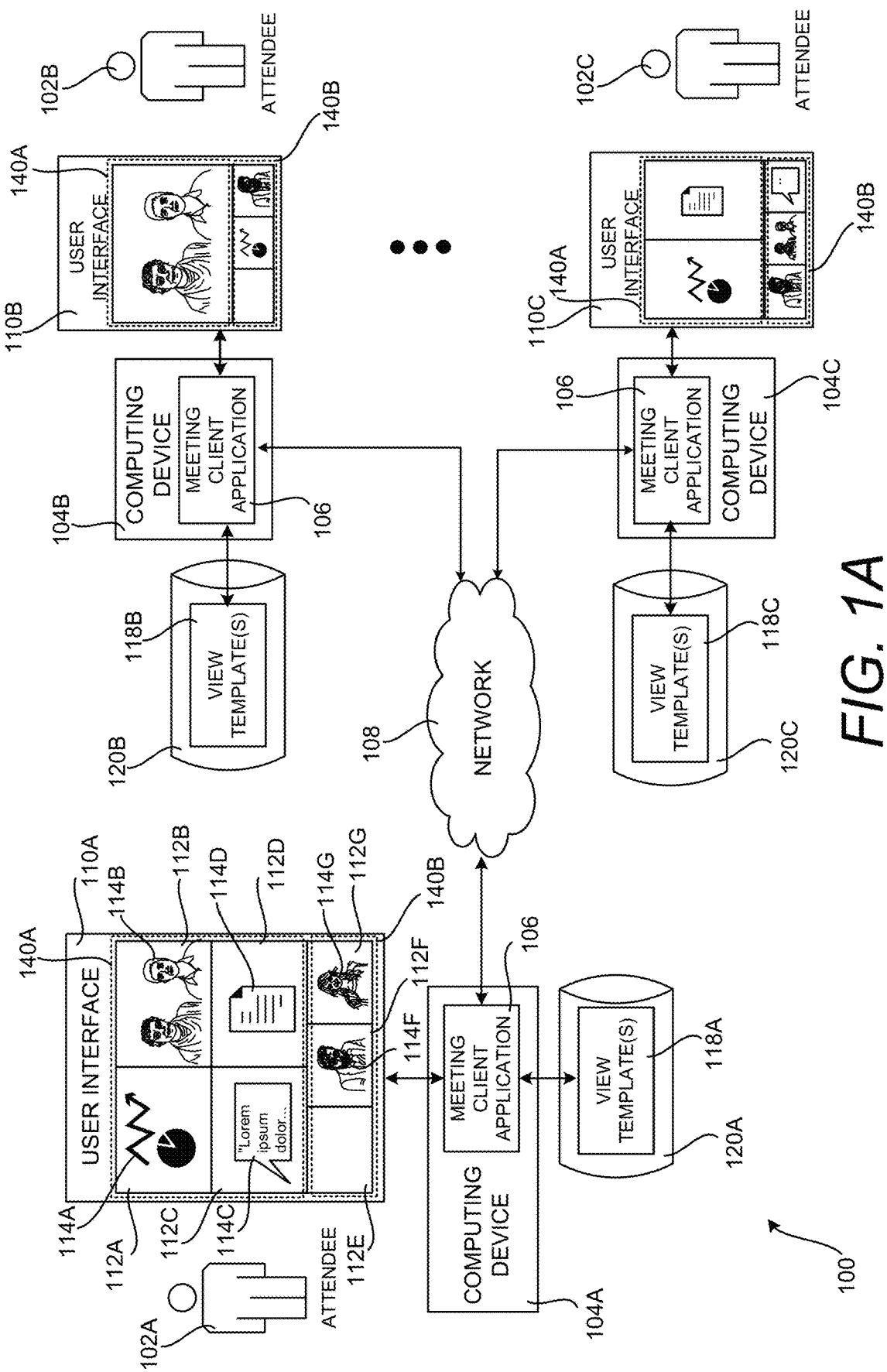

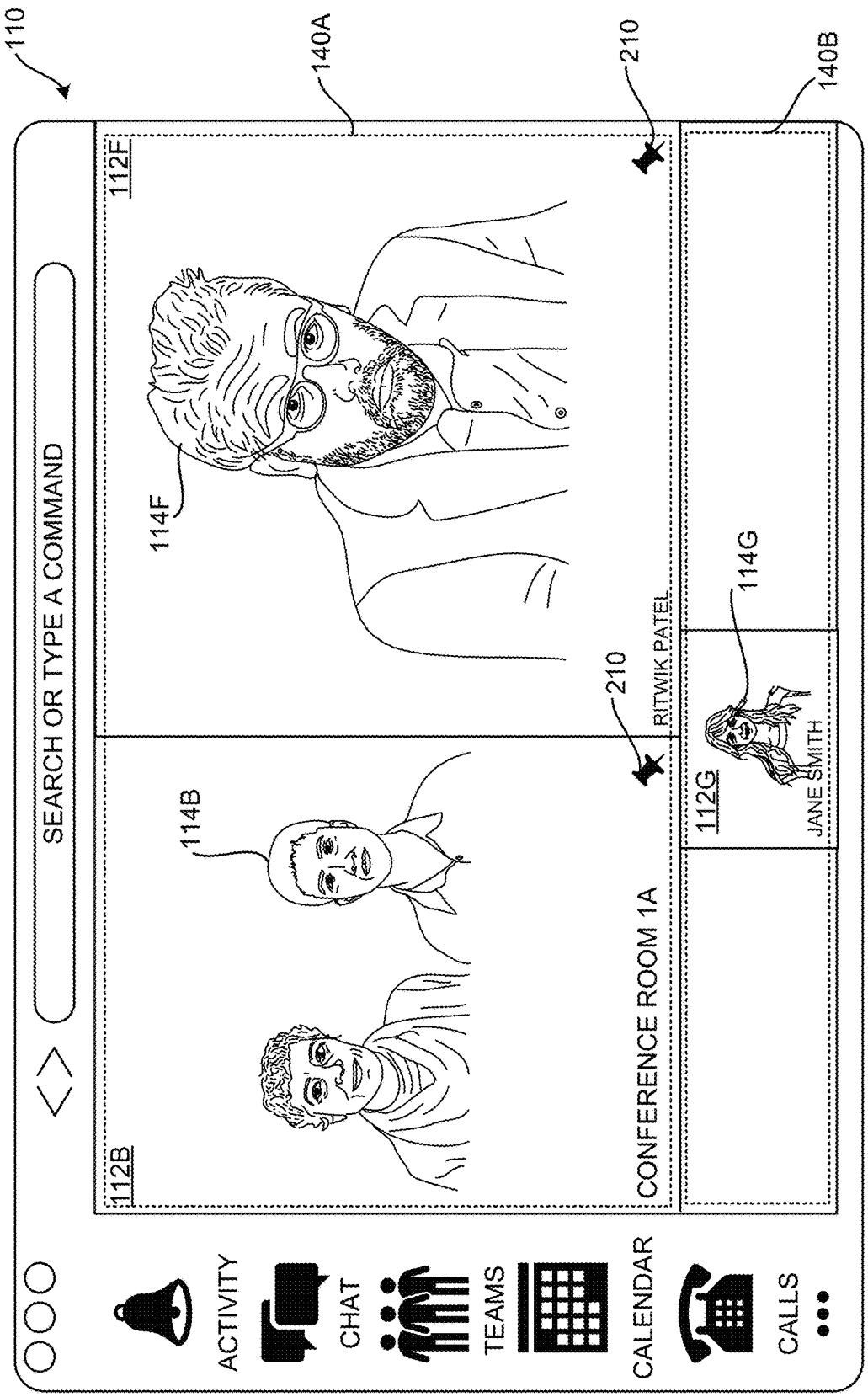

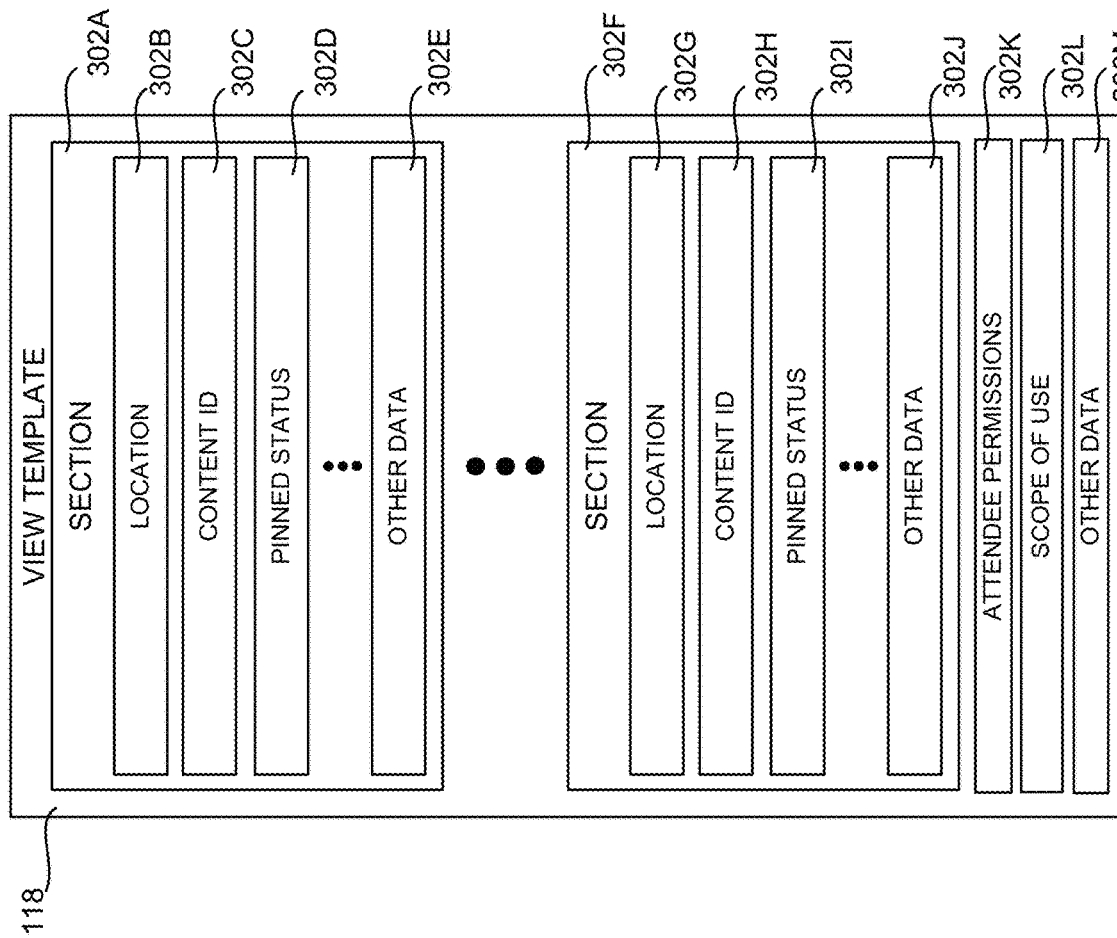

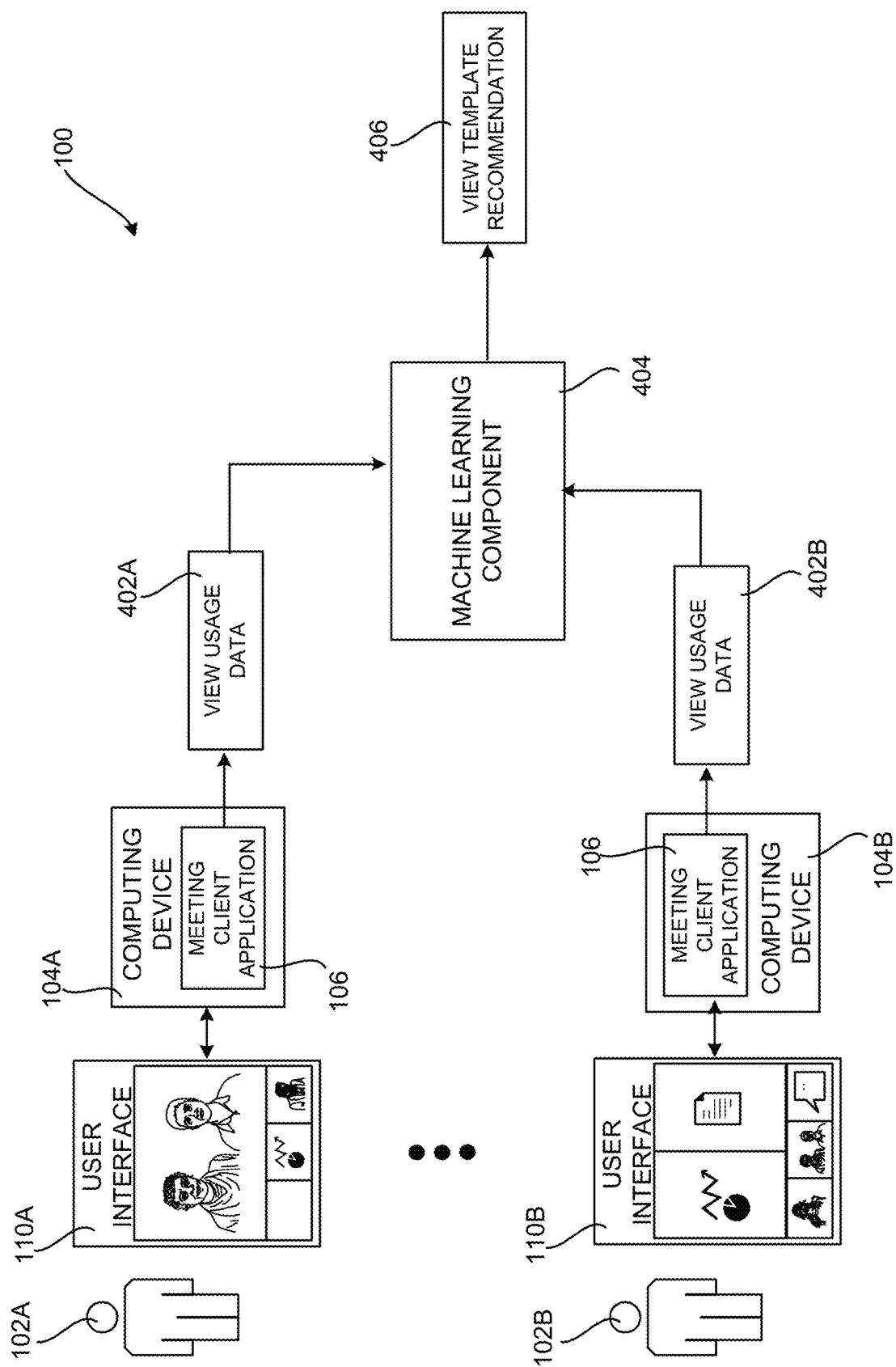

PROVIDING CONSISTENT INTERACTION MODELS IN COMMUNICATION SESSIONS

BACKGROUND

There are a number of different systems and applications that allow users to collaborate. For example, some systems provide collaborative environments that allow participants to exchange files, live video, live audio, and other forms of content within a communication session. In other examples, some systems allow users to post messages to a channel having access permissions for a select group of individuals for the purposes of enabling team-focused or subject-focused conversations.

Systems providing collaboration environments such as those described above commonly arrange the on-screen presentation of content automatically. For example, some systems will automatically arrange the on-screen presentation of live video streams based upon the activity of meeting participants, such as by making a portion of a user interface showing an active speaker larger than other the portions showing other participants. A video stream showing an active speaker might also be made full screen in other examples. In these cases, other content can be made smaller or removed from the display altogether.

Automatic arrangement of content presented during a communication session also results in different arrangements of content from meeting-to-meeting. For instance, content shown in one meeting between a group of participants might be shown in a different location or hidden altogether in a subsequent meeting between the same group of participants.

Changes in the layout of content during or between communication sessions such as those described above can be confusing and distracting to users, thereby resulting in less productive meetings and inefficient use of computing resources. For example, if a system does not display an optimized and consistent arrangement of shared content, users might not be able to readily identify the salient aspects of the shared content. In some scenarios, if shared content is not displayed properly or consistently, users might miss important details altogether.

Systems such as those described above can also work against the general principle that proper timing and consistent arrangement of content are essential for the optimization of user engagement. The issues described above might not only cause users to miss important content, such issues can also impact user engagement. The optimization of user engagement for any software application is essential for user productivity and efficient use of computing resources. Productivity loss and inefficiencies with respect to computing resources can be exacerbated when software applications do not optimize user engagement, particularly when used to provide a collaborative environment for a large number of participants.

SUMMARY

The technologies disclosed herein provide consistent interaction models during communication sessions. In order to provide this functionality, a system configured according to the disclosure presented herein can create a consistent interaction model that includes a user-defined arrangement of display areas in a user interface ("UI") for presenting content during communication sessions. A user can specify that some or all of the display areas are stationary within a primary display area of the UI (a process that might be referred to herein as "pinning" a display area). The arrangement, including the display areas defined as being stationary, can be presented to all or some of the participants in a communication session. For example, the same arrangement of display areas can be presented to attendees during a sequence of recurring meetings to ensure a consistent view of content. By providing a consistent arrangement of display areas that render content for viewing by participants in a communication session, the participants can be more engaged and productive, thereby improving human-computer interaction and conserving computing resources.

In one example, a system presents a UI that includes display areas for displaying renderings of content during a communication session. For example, the display areas might be configured to display renderings of video streams, still video, images, documents, or other types of content of interest during a communication session. The UI can also provide functionality for enabling a user to define a fixed arrangement of the display areas. For instance, the UI might receive a request from a user to make a selected display area stationary within a primary display area of the UI. In response thereto, the selected display area can be configured such that it remains stationary within the primary display area. This process can be repeated for multiple display areas to define the arrangement of display areas provided by the UI.

Data, which might be referred to herein as a "view template," can be stored that defines the arrangement of the display areas in the primary display area, including any stationary display areas contained therein. The view template can include, for instance, data defining locations of the display areas in the UI, data identifying content associated with the display areas in the UI, and data indicating whether each display area is stationary within the primary display area of the UI.

The view template can be transmitted to other computing devices participating in a communication session and used to render the UI on those computing devices, including the arrangement of display areas and any stationary display areas. In this way, all of the participants in a communication session can be presented with a UI that includes display areas rendering content that are arranged in the same manner. Additionally, the view template can be utilized during subsequent communication sessions, such as a sequence of recurring meetings between a group of participants, to present the same UI during each of the sessions. In this way, participants can view a consistent UI including content in different meetings.

In some examples, a view template can specify that only a subset of the stationary display areas in an arrangement of display areas in a UI can be presented to certain participants in a communication session. The subset of display areas can be selected manually or based upon user roles, permissions, or other types of data. In this way, a user defining a view template can limit the display areas that are presented to other participants in a communication session. A view template might also, or alternately, identify those users that are authorized to use the view template to render the arrangement of the display areas on their computing devices.

In a similar way, a user defining a view template can also specify that certain users are not permitted to modify the arrangement of the display areas in a UI defined by a view template. The users can be selected manually or based upon roles, permissions, or other data. In this way, a user defining a view template can ensure that the arrangement of display areas in a UI presented using the view template will be rendered consistently to all or only a portion of the participants in a communication session.

In other examples, computing devices utilized by participants in a communication session can generate data, referred to herein as "view usage data," that describes the arrangement of display areas, including display areas stationary within a primary display area, defined by the participants. The view usage data can be collected and utilized to generate and store a new view template. For example, the new view template might include data defining an arrangement of display areas in a UI for a communication session, including stationary display areas, used by a majority of the participants in the communication session. The new view template can be used during the same or different communication sessions. For instance, the new view template might be utilized during subsequent meetings in a sequence of recurring meetings.

In other examples, various mechanisms can be provided and utilized to select a view template for use during a particular communication session. For example, a view template for a communication session might be selected in a UI for defining an invitation to the communication session. Data associated with an invitation to a communication session, such as the subject, attendees, attachments, or content, can also be utilized to select a view template for a communication session. When the invitation defines a recurring meeting, the UI might provide functionality for selecting a view template to be utilized during each occurrence of the recurring meeting. Different view templates might also be specified for individual occurrences of a recurring meeting.

As another example, a view template used to generate a UI for a communication session or a sequence of recurring communication sessions might be selected based on roles, permissions, or other data associated with participants in the communication session. In yet other examples, machine learning ("ML") techniques can be utilized to select a view template for use during a communication session or for during recurring communication sessions.

A view template might also be selected through other types of UIs such as, for example, a UI that includes thumbnail images showing previews of available view templates. A view template for a communication session can be chosen in this example by selecting one of the thumbnail images. Other types of UIs can be utilized to select a view template in other examples.

The examples described herein are provided within the context of collaborative environments, e.g., private chat sessions, multi-user editing sessions, group meetings, live broadcasts, etc. For illustrative purposes, it can be appreciated that a computer managing a collaborative environment involves any type of computer managing a communication session where two or more computers are sharing data. In addition, it can be appreciated that the techniques disclosed herein can apply to any user interface arrangement that is used for displaying content. The scope of the present disclosure however is not limited to embodiments associated with collaborative environments.

The techniques disclosed herein provide a number of features that improve existing computers. For instance, computing resources such as processor cycles, memory, network bandwidth, and power, are used more efficiently as a system can improve user interaction and engagement during a communication session by providing consistent interaction models. The techniques disclosed herein can also provide consistent interaction models between different communication sessions, such as during different occurrences of the same recurring communication session, thereby also improving user interaction and engagement during the communication sessions. Improvement of user interaction can lead to the reduction of user input data error, which can mitigate inadvertent inputs, redundant inputs, and other types of user interactions that utilize computing resources. Other technical benefits not specifically mentioned herein can also be realized through implementations of the disclosed subject matter.

Those skilled in the art will also appreciate that aspects of the subject matter described herein can be practiced on or in conjunction with other computer system configurations beyond those specifically described herein, including multiprocessor systems, microprocessor-based or programmable consumer electronics, augmented reality or virtual reality devices, video game devices, handheld computers, smartphones, smart televisions, self-driving vehicles, smart watches, e-readers, tablet computing devices, special-purpose hardware devices, networked appliances, and the others.

Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

FIG. 1A illustrates a system that enables consistent interaction models in communication sessions.

FIG. 2E illustrates an example scenario where a user can request to make a display area in a user interface stationary within a primary display area.

FIG. 3 shows an illustrative configuration for a data structure storing data defining a layout of stationary display areas within a primary display area of a user interface.

FIG. 4 illustrates a system that utilizes machine learning to recommend interaction models for use in communication sessions.

DETAILED DESCRIPTION

Figure 1B:
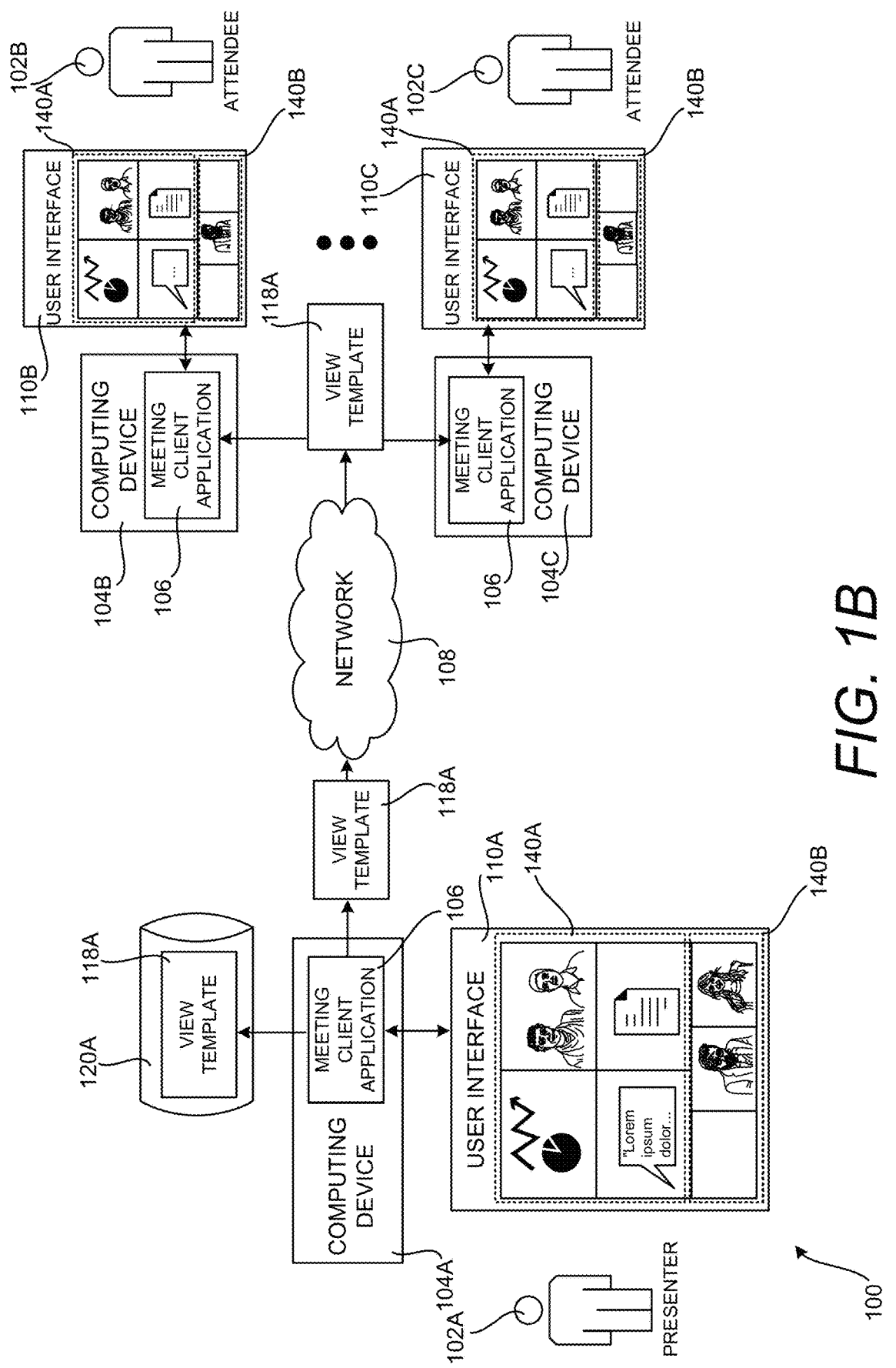
FIG. 1B illustrates a system that enables consistent interaction models in communication sessions.

FIG. 1A illustrates a system 100 that provide consistent interaction models during communication sessions. Computing devices 104 in the system 100 can present a UI 110 that includes display areas 112 for displaying renderings 114 of content during a communication session. The UI 110 can also provide functionality for enabling a user 102 (which might be referred to herein as a "participant" or "attendee") to define a fixed arrangement of the display areas 112. For instance, the UI 110 might receive a request from a user 102 to make a selected display area 112 stationary within a primary display area 140A of the UI 110. In response thereto, the selected display area 112 can be configured such that it remains stationary within the primary display area 140A. This process can be repeated for multiple display areas 112 to define the arrangement of display areas 112 provided by the UI 110. A view template 120 can then be stored that includes data defining the arrangement of the display areas 112 in the primary display area 140A, including any stationary display areas 112 contained therein.

A view template 120 can be transmitted to other computing devices 104 participating in a communication session and used to render the UI 110 on those computing devices 104, including any stationary display areas 112 in the primary display area 140A. In this way, all of the participants 102 in a communication session can be presented with a UI 110 that includes display areas 112 showing renderings 114 of content that are arranged in the same manner. Additionally, view templates 120 can be utilized during subsequent communication sessions, such as individual occurrences of a recurring communication session, to present the same UI 110. In this way, participants 102 can view a consistent UI 110 including renderings 114 of content that are arranged in the same manner in different communication sessions. Additional details regarding these aspects will be provided below.

The system 100 shown in FIG. 1A can be configured to provide a collaborative environment that facilitates the communication between two or more computing devices. The collaborative environment can allow users 102 to exchange live video, live audio, and other forms of content within a communication session. A collaborative environment can be in any suitable communication session format including but not limited to private chat sessions, multi-user editing sessions, group meetings, broadcasts, etc.

The system 100 can include a server computer, such as that described below with regard to FIG. 12, to manage a communication session between any suitable number of computing devices 104. In this example, the system 100 facilitates a communication session between a first computing device 104A, second computing device 104B, third computing device 104C, up to any number of computing devices 104N, collectively referred to herein as "computing devices 104." The computing devices 104 can be in any form such as a laptop, desktop, tablet, phone, a virtual reality head-mounted device, or a mixed-reality device. The computing devices can communicate via one or more data communications networks 108.

The computing devices 104 can execute a meeting client application 106 that facilitates the communication session. For example, the meeting client application 106 might display a UI 110 that includes a number of different display areas 112A-112G. Content shared by video streams, audio streams, or files, can be communicated between each of the computing devices 104. Each of the computing devices 104 can display renderings 114 of the shared content in the UI 110. One or more computing devices 104 of the system 100 can define and select an interaction model the defines an arrangement of the display areas 112 within the UI 110 displayed to users 102 at each computing device 104.

As will be described in greater detail herein, the UI 110 also provides functionality for enabling users 102 to define a fixed arrangement of display areas 112 within a primary display area 140A of the UI 110. In the example shown in FIG. 1A, for instance, the user 102A has utilized the UI 110A to define a fixed arrangement of the display areas 112A-112D in the primary display area 140A. The display areas 112A-112D display renderings 114A-114D of content, respectively. Other display areas 112E-112G are presented in a secondary display area 140B of the UI 110 and are not stationary. The display areas 112E-112G might be rearranged based upon various conditions such as, but not limited to, an identification of an active speaker in the communication session.

In the example shown in FIG. 1A, another user 102B has utilized the UI 110B presented by the meeting client application 106 executing on the computing device 104B to define a different arrangement of stationary display areas in the primary display area 140A of the UI 110B. Similarly, the user 102C has utilized the UI 110C presented by the meeting client application 106 executing on the computing device 104C to define yet another arrangement of stationary display areas 112 in the primary display area 140A of the UI 110C.

Using the mechanism described briefly above, and in further detail below, each of the users 102A-102C has defined an arrangement of display areas 112 within the UI 110 that remain stationary within the primary display area 140A. Because the display areas 112 within the primary display area 140A are stationary, the arrangement of the display areas 112 will not change in response to various conditions such as, for example, the identity of the currently active speaker in the communication session. In this way, the users 102A-102C are presented with a UI 110 that includes a primary display area 140A that includes an arrangement of display areas 112 that is consistent throughout a communication session.

As discussed above, by providing a consistent arrangement of display areas 112 that render content for viewing by participants 102 in a communication session or during recurring communication sessions, the participants 102 can be more engaged and productive, thereby improving human-computer interaction and conserving computing resources. Other technical benefits might also be realized through implementations of the disclosed technologies.

Once a user 102 has defined an arrangement of display areas 112 within the UI 110, the meeting client application 106 can store a view template 118 in an appropriate local or networked data store 120. A view template 118 includes data that defines the arrangement of the display areas 112 in the primary display area 140A of the UI 110, including any stationary display areas 112 contained therein. The view template 118 can include, for instance, data defining the locations of the display areas 112 in the UI 110, data identifying content associated with the display areas 112 in the UI 110, and data indicating whether each display area 112 is stationary within the primary display 140A area of the UI 110. A view template 118 can include other data in other examples, some of which are described below.

In the example shown in FIG. 1A, for instance, a view template 118A has been stored in the data store 120A that includes data defining the arrangement of the display areas 112A-112G in the UI 110A, including the stationary display areas 112A-112D in the primary display area 140A of the UI 110A. Similarly, a view template 118B has been stored in the data store 120B that includes data defining the arrangement of the display areas 112 in the UI 110B, including the stationary display areas 112 in the primary display area 140A of the UI 110B. Likewise, a view template 118C has been stored in the data store 120A that includes data defining the arrangement of the display areas 112 in the UI 110C, including the stationary display areas 112 in the primary display area 140A of the UI 110C.

As discussed above, the UI 110 can be utilized to define an arrangement of stationary display areas 112 in a primary display area 140A, which allows renderings 114 of content to be presented in a consistent manner throughout a communication session. A view template 118 allows renderings 114 of content to be presented in a consistent manner in the same or different communication sessions, such as individual occurrences of a recurring communication session. For instance, a user 102A might define an arrangement of display areas 112A-112D in a primary display area 140A in the manner described above. The user 102A might then utilize the meeting client application 106 to store a view template 118A that defines the stationary arrangement of the display areas 112A-112D.

In a subsequent communication session between the same or different users 102 (e.g. an instance of a recurring meeting), the user 102A might utilize the meeting client application 106 to load the view template 118A. The meeting client application 106 can utilize the data stored in the view template to present the same UI 110A to the user 102A. In this way, a consistent arrangement of display areas 112 that render content for viewing by participants 102 can be presented during different communication sessions. This, also, can enable the participants 102 in the communication session to be more engaged and productive, thereby improving human-computer interaction and conserving computing resources.

In some examples, a view template 118 can be shared between computing devices 104 in order to provide a consistent view of the content presented during a communication session to some or all of the participants in the communication session. This is illustrated in FIG. 1B. In this example, a user 102A has defined an arrangement of display areas 112 in a UI 110A that includes stationary display areas 112 in a primary display area 140A. The user 102A has also utilized the meeting client application 106 to request that a view template 118A that includes data defining the arrangement be transmitted to the other computing devices 104B and 104C in the communication session.

The computing devices 104B and 104C receive the view template 118A and utilize the view template 118A to generate UIs 110B and 110C, respectively, that provide the same arrangement of display areas 112 in the primary display area 140A as shown by the computing device 104A. In this manner, one user 102 in a communication session, such as a presenter, can define an arrangement of stationary display areas 112 in the primary display area 140A and cause other computing devices 104 to present the same arrangement. As in the examples given above, the consistent presentation of content shared in a communication session in this manner can increase user engagement in a meeting thereby increasing productivity, can improve human-computer interaction, and can result in the conservation of computing resources.

To illustrate additional aspects of the present disclosure, FIGS. 2A through 2H illustrate aspects of various mechanisms disclosed herein for defining an arrangement of stationary display areas 112 in a primary display area 140A of a UI 110 such as that described briefly above. Although the context of the presented examples is described in conjunction with a system managing a collaborative environment, the techniques disclosed herein are not limited to collaborative environments. It can be appreciated that the interaction models defined by the mechanisms disclosed herein can apply to any computing environment involving a user interface for displaying content.

Figure 2A:
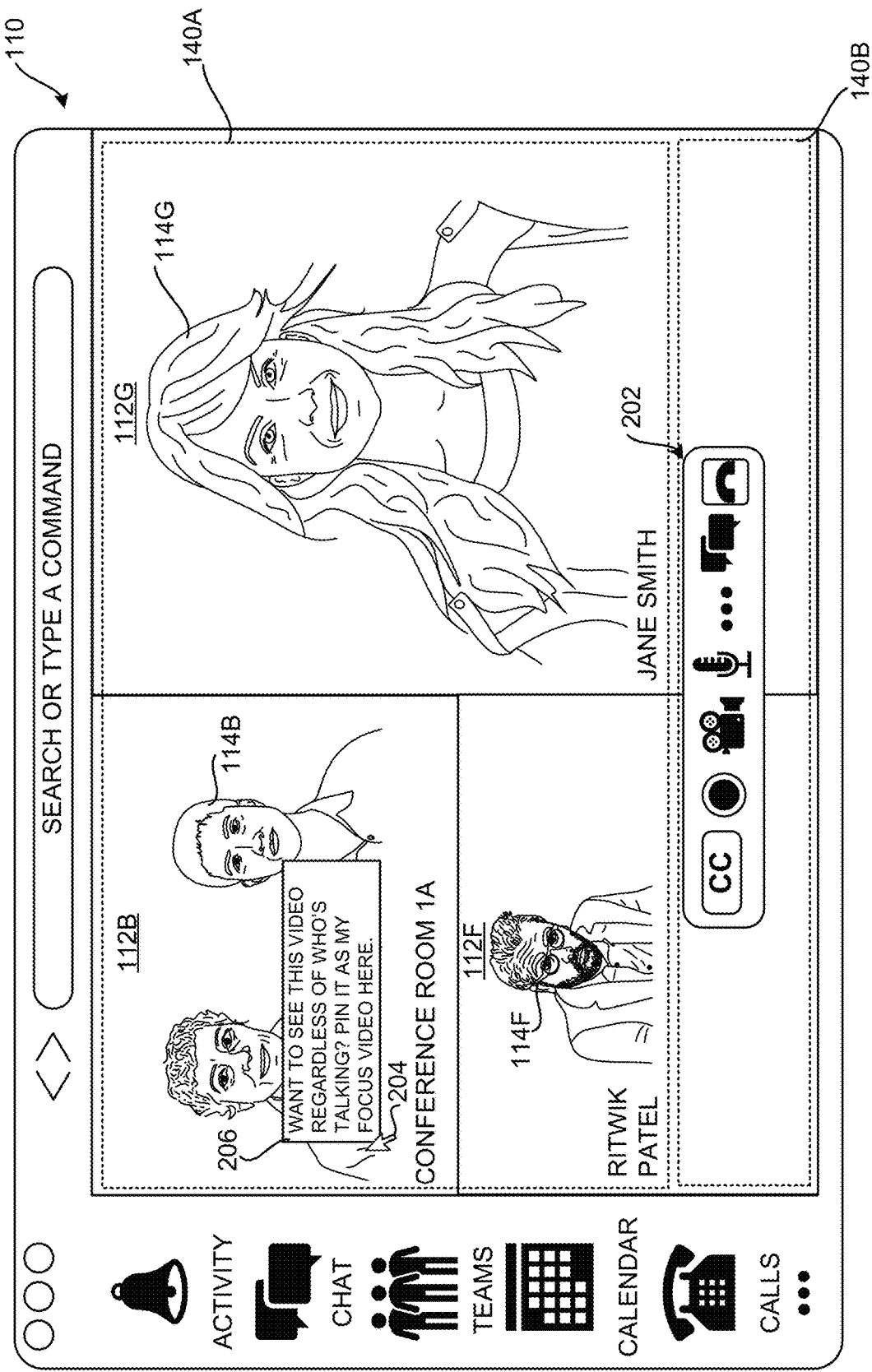
FIG. 2A illustrates an example scenario where a user can request to make a display area in a user interface stationary within a primary display area.

In the example shown in FIG. 2A, the meeting client application 106 has presented a UI 110 that includes a primary display area 140A and a secondary display area 140B. In this example, the primary display area 140A includes three display areas 112B, 112G, and 112F displaying renderings 114B, 114G, and 114F of content, respectively. In this case the content is video streams of other participants 102 in the communication session. However, renderings of other types of content can be presented in the display areas 112 in other examples.

The illustrative UI 110 shown in FIG. 2A also includes a toolbar 202 and several icons for initiating various types of functionality with respect to the current communication session such as, but not limited to, chatting with other participants, viewing teams of users, viewing calendars, placing calls, turning a closed caption display on or off, recording the communication session, and muting a speaker, microphone, or video capture device. Other types of functionality can be performed in other configurations. The toolbar 202 has been omitted from the remainder of the FIGURES for ease of illustration.

In the example shown in FIG. 2A, a user 102 has also initiated a selection operation with respect to the display area 112B. In the illustrated example, the user 102 has utilized a pointing device and associated cursor 204 to select the display area 112B (e.g. by moving the cursor 204 into the display area 112B and selecting a left or right button on a user input device like a mouse or trackpad). In this regard, it is to be appreciated that while the user input described with respect to the examples presented herein is made with a pointing device, such as a mouse or trackpad, other types of user input devices (e.g. touchscreens) can be utilized to perform the functionality disclosed herein.

In response to the selection operation, the UI 110 has presented a message 206 providing instructions to the user 102 regarding the process for specifying that a display area 112 is to be made stationary within the primary display area 140A. The message 206 might be presented only once in order to provide assistance to a user. When the user 102 initiates a second selection operation with respect to the display area 112B, the UI 110 presents a menu 208, as illustrated in FIG. 2B.

Figure 2B:
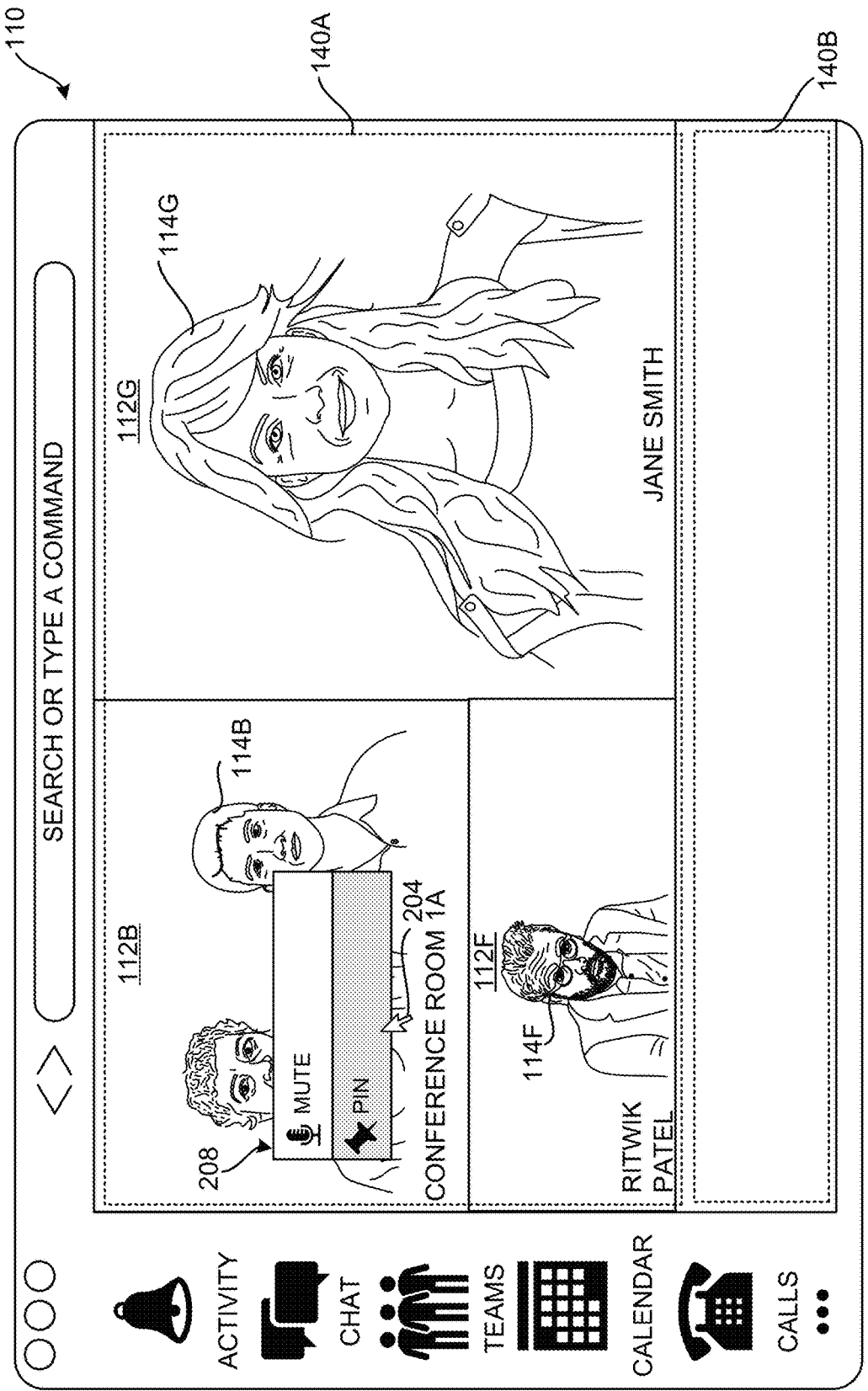
FIG. 2B illustrates an example scenario where a user can request to make a display area in a user interface stationary within a primary display area.

In the example shown in FIG. 2B, the menu 208 includes a menu item which, when selected, such as by using the cursor 204, will make the associated display area 112 (i.e. the display area 112B in FIG. 2B) stationary within the primary display area 140A. When a display area 112 is made stationary within the primary display area 140A, it will not be removed from the primary display area 140A unless a user 102 requests that it be removed. The location and size of the display area 112 might be modified such as, for example, if other display areas 112 are also made stationary within the primary display area 140A. But, a stationary display area 112 will not be removed from the primary display area 140A.

In the example shown in FIG. 2B, a user 102 has selected the menu item in the menu 208 for making the display area 112B stationary. In response thereto, the UI 110 transitions to the configuration shown in FIG. 2C. In this example, the size of the display area 112B has been enlarged to fill the entirety of the primary display area 140A because no other display areas 112 have been previously made stationary within the primary display area 140A. Rather, the non-stationary display areas 112F and 112G previously in the primary display area 140A have been demoted to the secondary display area 140B. In this manner, a focused view of the rendering 114B of the content shown in the display area 112B can be presented. Additionally, an icon 210 has been displayed in the display area 112B indicating that the display area 112B is stationary.

Figure 2C:
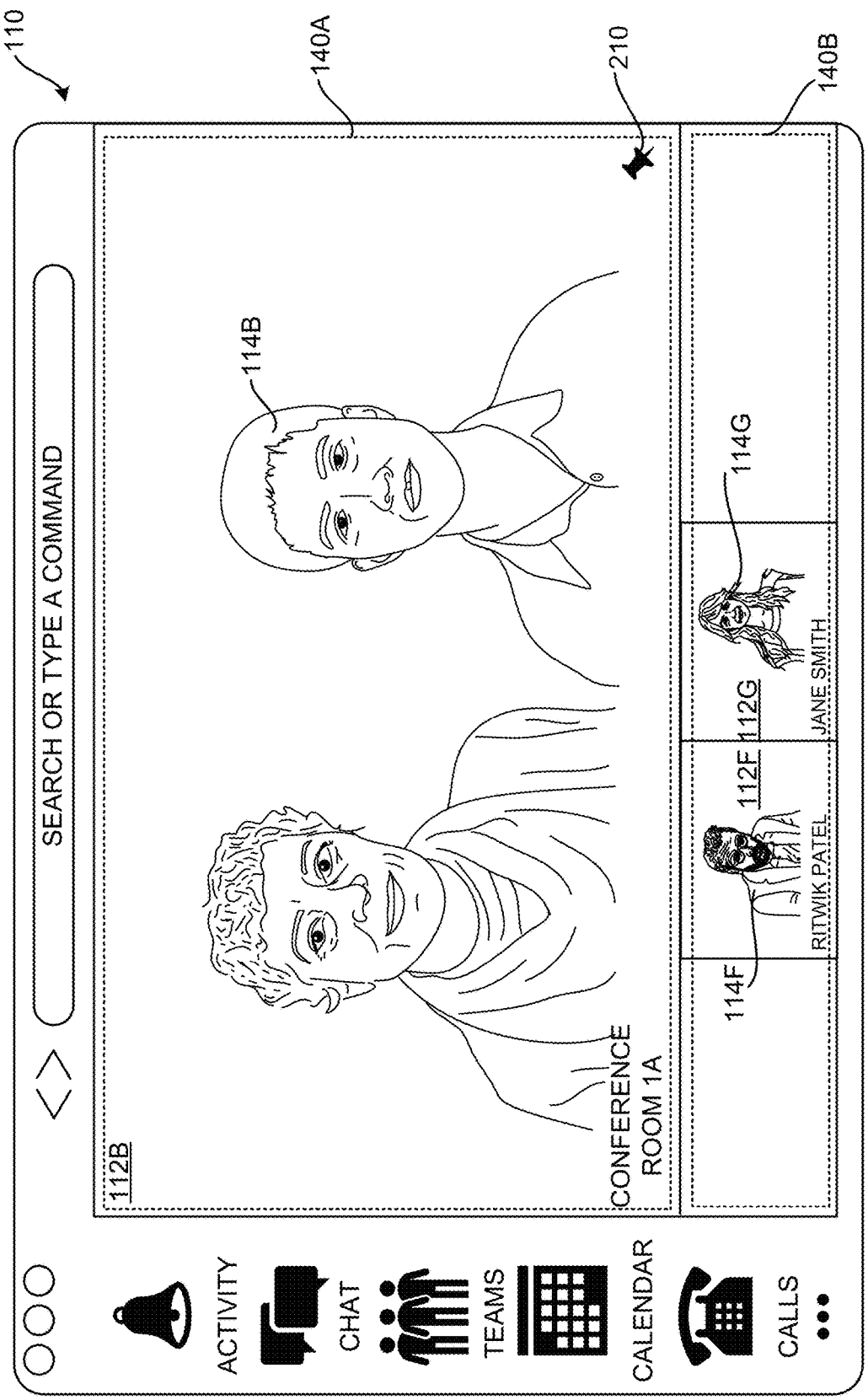
FIG. 2C illustrates an example scenario where a display area in a user interface has been made stationary within a primary display area.
Figure 2D:
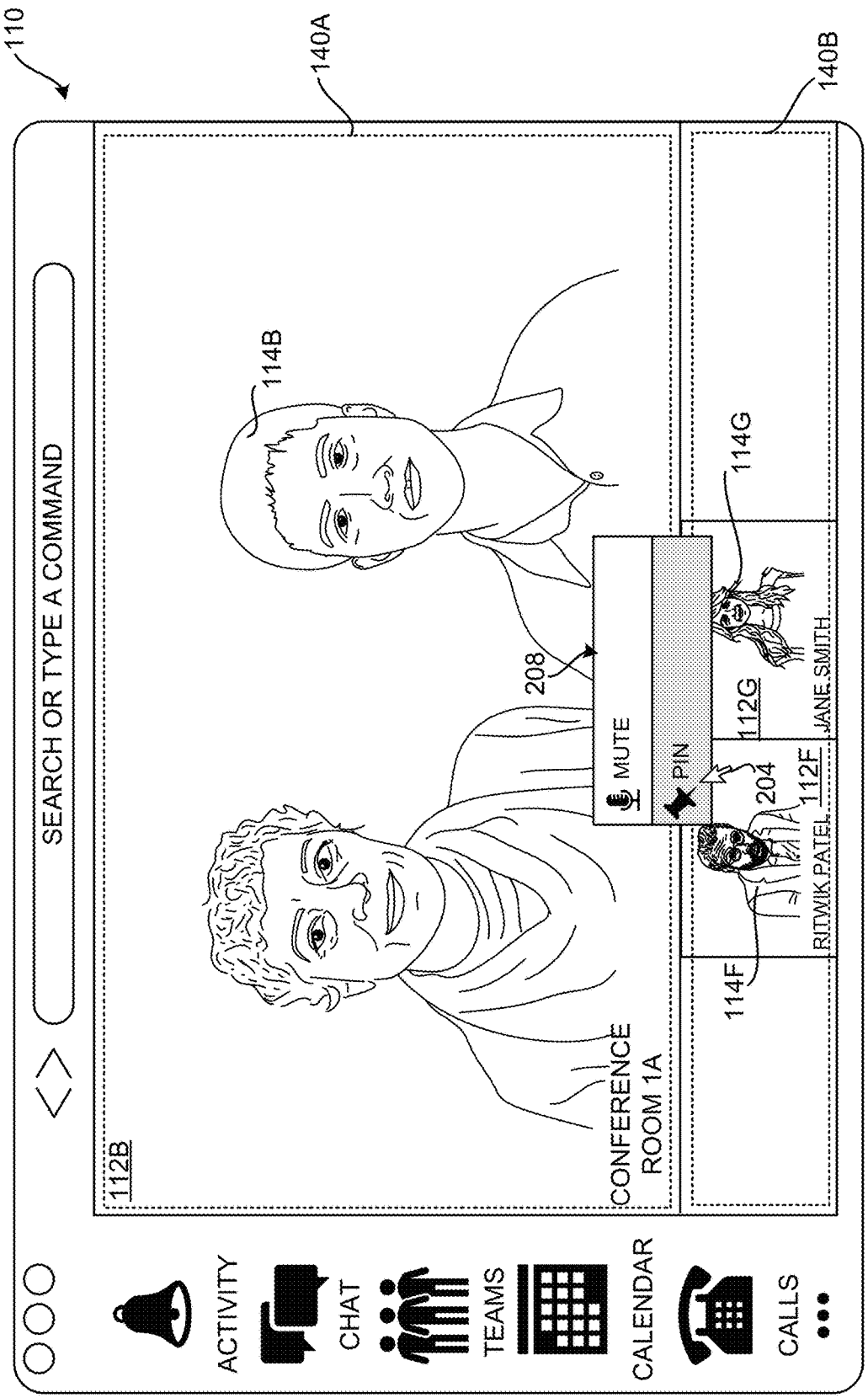
FIG. 2D illustrates an example scenario where a user can request to make a display area in a user interface stationary within a primary display area.

Continuing the example from FIGS. 2A-2C, a user 102 has selected the display area 112F in the example shown in FIG. 2D. In response thereto, the menu 208 has been presented in the UI 110. In turn, the user 102 has selected the menu item for making the display area 112F stationary using the cursor 204 and, as a result, the UI 110 has transitioned to the configuration shown in FIG. 2E.

As shown in FIG. 2E, the display area 112F has been removed from the secondary display area 140B and made stationary in the primary display area 140A in response to the user selection. Additionally, the display areas 112B and 112F have also been resized to accommodate side-by-side presentation in the primary display area 140A. An icon 210 has also been presented in the display area 112F to indicate that this display area is now stationary within the primary display area 140A. Any number of display areas 112 that are stationary within the primary display area 140A can be resized such that they encompass the entirety of the primary display area 140A in a similar fashion.

Figure 2F:
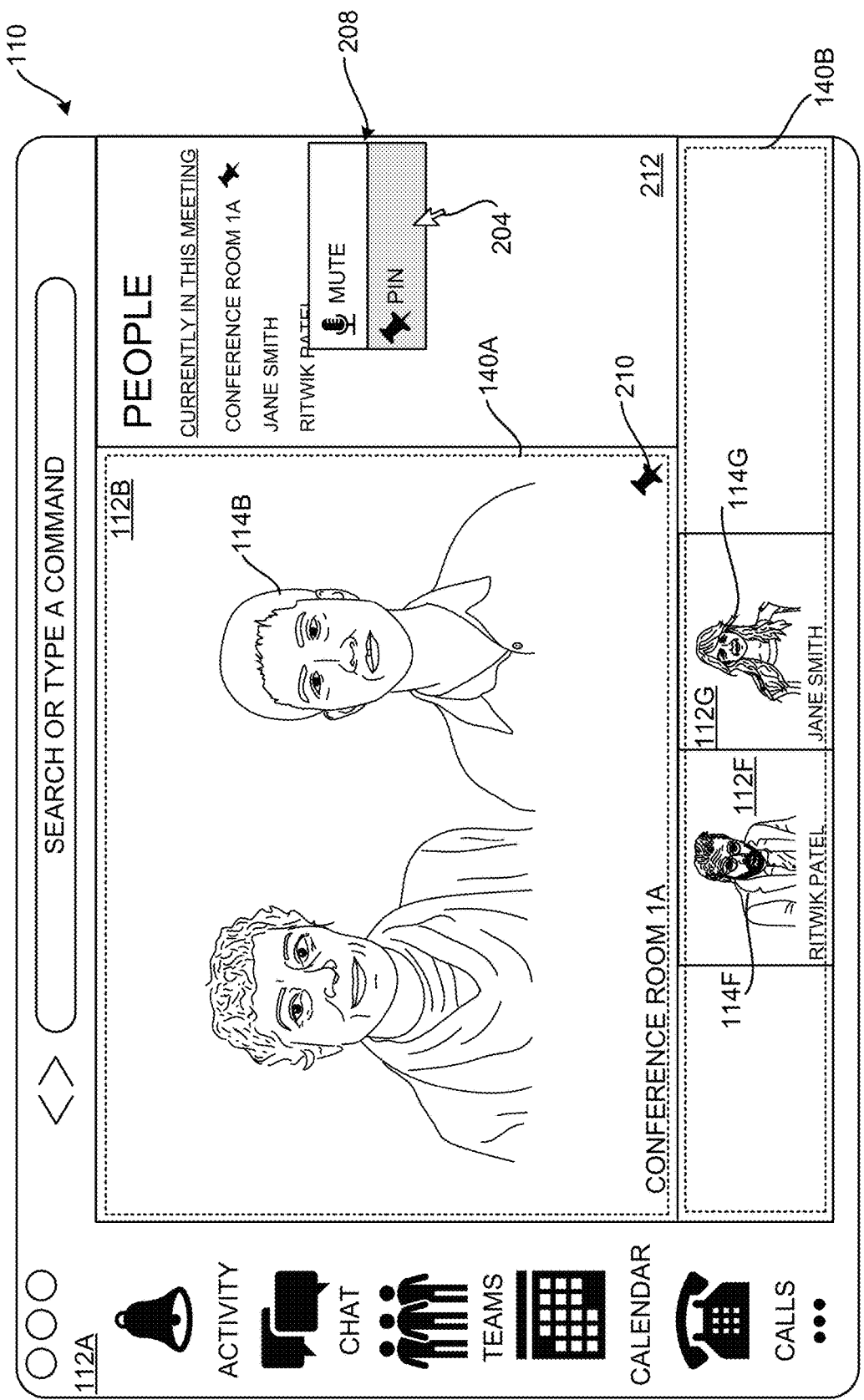
FIG. 2F illustrates an example scenario where a user can request to make a display area in a user interface stationary within a primary display area using a list of attendees.

Another mechanism for making display areas 112 stationary within a primary display area 140A is shown in FIG. 2F. In this example, the display area 112B has previously been made stationary in the primary display area 140A. Two other display areas 112F and 112G have not been made stationary and, accordingly, are presented in the secondary display area 140B. Additionally, the UI 110 shown in the example illustrated in FIG. 2F includes a section 212 that includes entries identifying the display areas 112B, 112F, and 223G. In this example, the section 212 includes entries identifying a conference room from which video content is being streamed and shown by the rendering 114B in the display area 112B. In this example, the display area 112B has been made stationary within the primary display area 140A.

The section 212 also includes entries identifying two other participants (i.e. Jane Smith and Ritwik Patel) that are shown in the display areas 112G and 112F, respectively. In this example, a user 102 has utilized the cursor 204 to select a menu item in the menu 208 for requesting that the display area 112F associated with the user Ritwik Patel be made stationary in the primary display area 140A. In response thereto, the UI 110 has transitioned to the configuration shown in FIG. 2G.

Figure 2G:
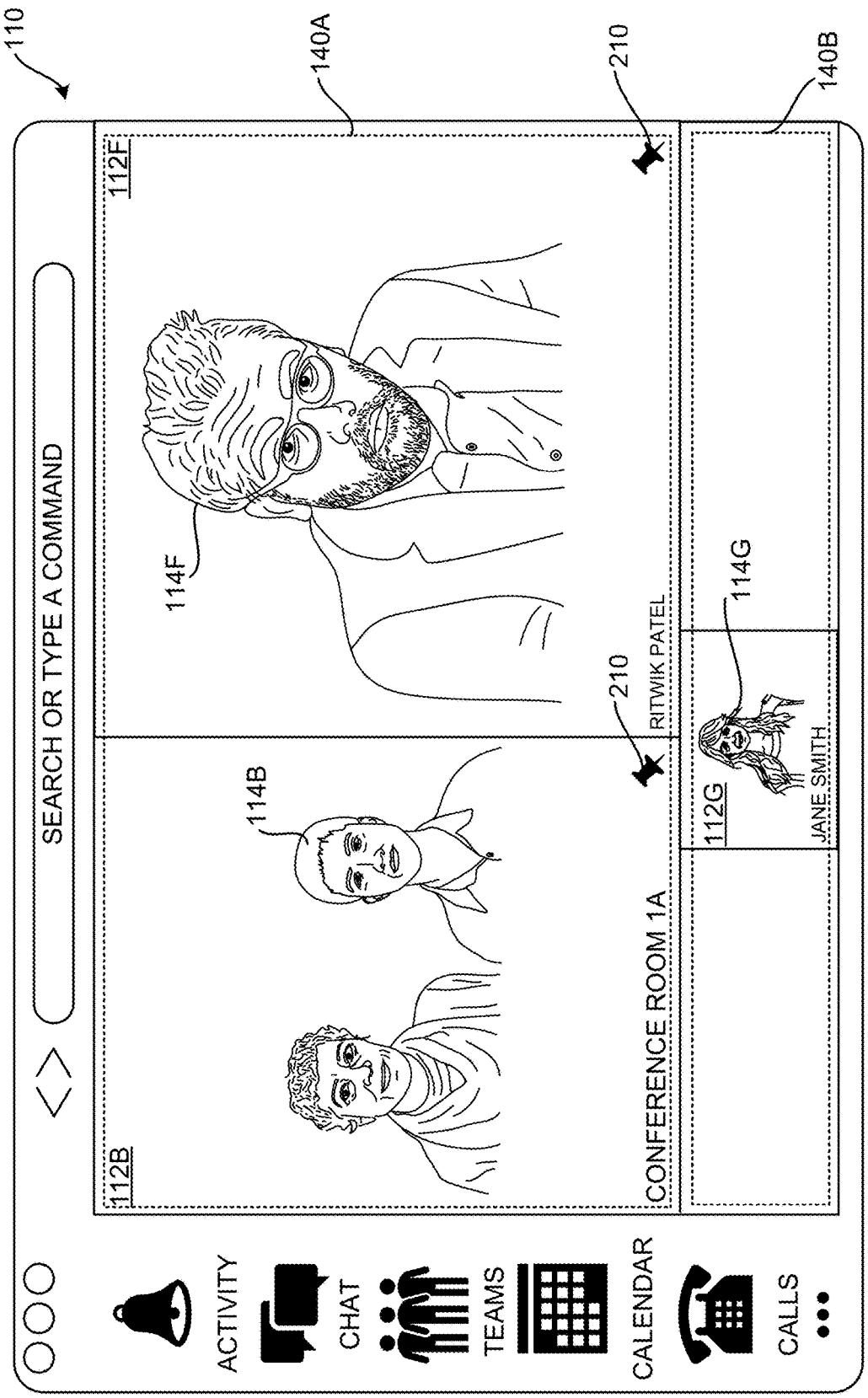
FIG. 2G illustrates an example scenario where a user can request to make a display area in a user interface stationary within a primary display area using a list of attendees.

As shown in FIG. 2G, the display area 112G has been made stationary within the display area 140A in response to the user selection described above with respect to FIG. 2F. Accordingly, the display area 112G has been promoted from the secondary display area 140B to the primary display area 140A and enlarged to encompass one-half of the primary display area 140A. Additionally, display area 112B, which was previously made stationary within the primary display area 140A, was also resized to encompass the other half of the primary display area 140A. Icons 210 were also presented in each display area 112B and 112F to indicate that these display areas are stationary within the primary display area 140A. Additional display areas 112 shown in the secondary display area 140B, such as the display area 112G, can be made stationary in a similar fashion.

As described briefly above, the display areas 112 can be configured to display renderings 114 of video streams, still video, images, documents, or other types of content of interest during a communication session. Other types of content that can be presented in the display areas 112 include, but are not limited to, panoramic or 360 degree videos or images, still images, text chat, a whiteboard, a user icon, text or digital ink, a transcription of the audio of a communication session, a virtual object, or video zoomed to highlight a particular object. Renderings 114 of other types of content can be presented in the display areas 112 in other configurations.

Figure 2H:
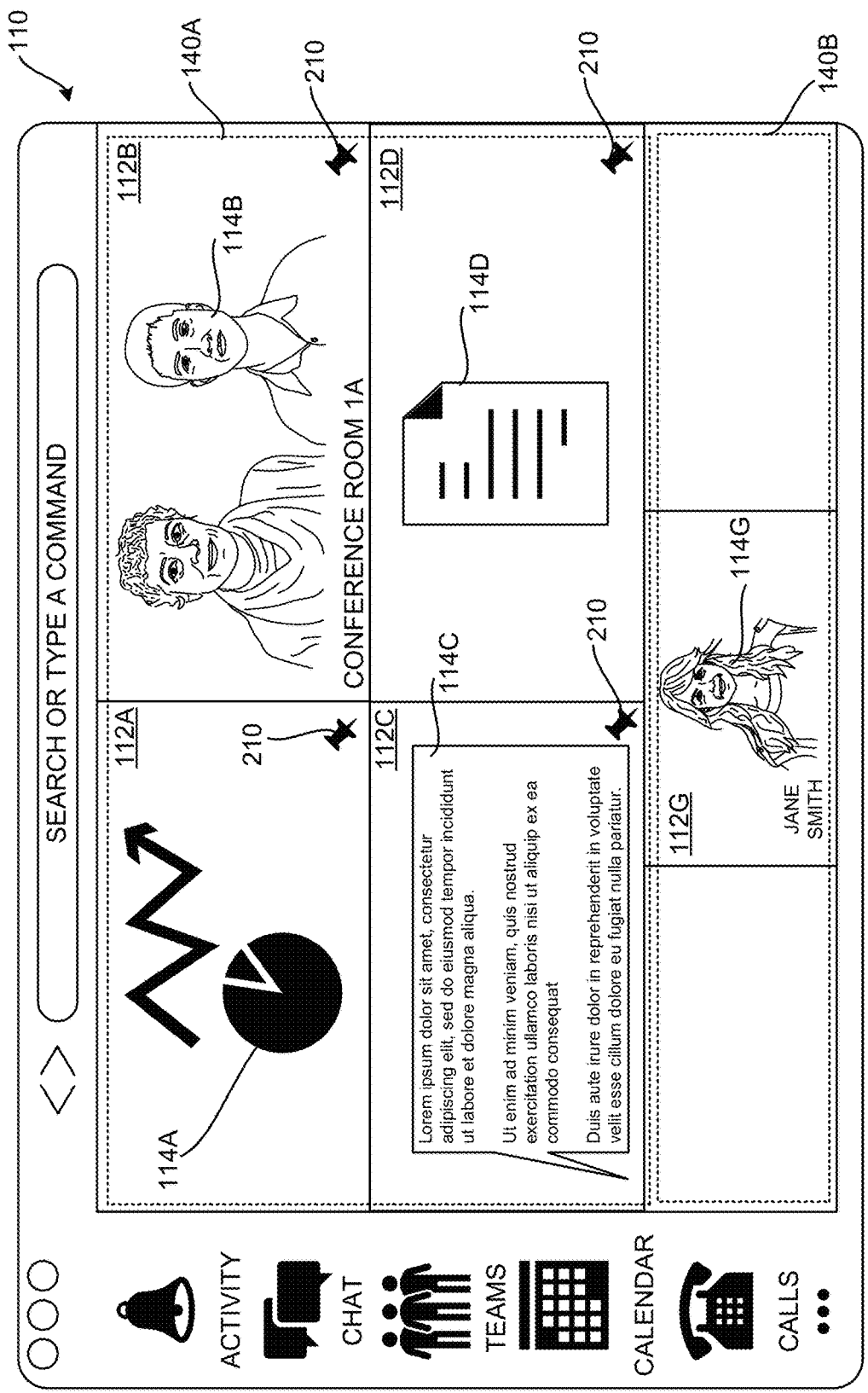
FIG. 2H illustrates an example scenario where a user can make display areas presenting different types of content stationary within a primary display area of a user interface.

In the example shown in FIG. 2H, the UI 1100 has been configured with four stationary display areas 112A-112D. The display area 112A presents a rendering 114A of a document containing a graph. The display area 112B presents a rendering 114B of a video stream showing two participants in the communication session. The display area 112C presents a rendering 114C of text chat exchanged between the participants in the communication session. The display area 112D presents a rendering 114D of a document which might be, for example, a word processing document, a spreadsheet document, a presentation document, a drawing, notes, or another type of document. The display areas 112A-112D have also been resized to fit within the primary display area 140A and an icon 210 has been displayed within each of the display areas 112A-112D to indicate that these display areas are stationary within the primary display area 140A.

It is to be appreciated that the mechanisms described above for making display areas 112 stationary within the primary display area 140A are merely illustrative and that other types of interactions can be utilized to make display areas 112 stationary in other configurations. These examples are not intended to be limiting, but rather to illustrate several types of interactions that can be utilized to create an arrangement of stationary display areas 112 that can be defined by a view template 118 and utilized in the manner described briefly above and in further detail below.

FIG. 3 illustrates an example configuration for a view template 118 in one specific example. As described briefly above, a view template 118 includes data that defines the arrangement of the display areas 112 in the primary display area 140A of the UI 110, including any stationary display areas 112 contained therein. In the example shown in FIG. 3, for instance, the view template 118 includes data defining several sections 302A-302F. Each section 302 can include data defining aspects of the configuration of each display area 112.

For instance, in the illustrated example, the section 302A includes data 302B defining the location of a display area 112 in the UI 110, data 302C identifying the content rendered in the display area 112, and data 302D indicating whether the display area 112 is stationary within the primary display 140A area of the UI 110. Similarly, the section 302B includes data 302G defining the location of another display area 112 in the UI 110, data 302H identifying the content rendered in the display area 112, and data 302I indicating whether the display area 112 has been made stationary within the primary display 140A area of the UI 110 in the manner described above. The sections 302A-302F in a view template 118 can include other data 302E and 302J, respectively, in other examples.

The illustrative view template 118 shown in FIG. 3 also includes data defining the manner in which the view template 118 can be used. For instance, the example view template 118 includes data 302K that defines the permissions of the attendees in a communication session to use the view template 118. For instance, the data 302K might specify that only a subset of the stationary display areas 112 in an arrangement of display areas 112 in a UI 110 are to be presented to certain participants in a communication session. The subset of display areas 112 can be selected manually or based upon user roles, permissions, or other types of data associated with a participant. In this way, a user defining a view template 118 can limit the stationary display areas 112 that are presented to other participants in a communication session.

The data 302K in a view template 118 might also, or alternately, identify those users 102 in a communication session that are authorized to use the view template 118 to render the arrangement of the display areas 112 on their computing devices 104. In this way, use of the view template 118 can be restricted to only certain pre-defined users 102.

A view template 118 can also include data 302L that describes the scope of use for users 102 of the view template 118. For instance, in the illustrated example, the view template 118 includes data 118 indicating that certain users 102 are not permitted to modify the arrangement of the stationary display areas 112 in a UI 110 defined by a view template 118. The users 102 can be selected manually or based upon roles, permissions, or other data. In this way, a user 102 defining a view template 118 can ensure that the arrangement of stationary display areas 112 in a UI 110 presented using a view template 118 will be rendered consistently to all or only a portion of the participants in a communication session. The view template 118 can include other types of data 302M in other configurations. Additional details regarding the use of the data 302K and 302L will be provided below with regard to FIGS. 9 and 10.

In other examples, various mechanisms can be provided and utilized to select a view template 118 for use during a particular communication session, such as for an instance of recurring communication session or all of the instances of a recurring communication session. For instance, in the example shown in FIG. 4, a machine learning ("ML") component 404 is configured to select a view template 118 for use during a communication session. In this example, the meeting client application 106 generates view usage data 402 that describes the arrangement of display areas 112 being utilized by the participants in a communication session, including display areas 112 that have been made stationary within the primary display area 140A.

In the example shown in FIG. 4, for instance, the user 102A has made one display area 112 stationary within the UI 110A. In turn, the meeting client application 106 has generated view usage data 402A that describes the layout of the UI 110A, including the stationary display areas 112. In this example, the user 102B has made two display areas 112 stationary within the UI 110B. Accordingly, the meeting client application 106 has generated view usage data 402B describing the layout of the UI 110B.

The ML component 404 receives the view usage data 402A and 402B and, potentially, other types of information. This information might include, but is not limited to, data identifying the participants in a communication session, the type of content rendered in the display areas 112, data identifying view templates used during previous communication sessions, and other types of metadata associated with a communication session. Using this data, the ML component 404 can learn to identify a view template 118 suitable for use during a communication session.

The ML component 404 can utilize various types of ML methods to learn to train ML models for identifying view templates 118 for a communication session. For example, and without limitation, such a ML model, or models, can be trained using supervised learning algorithms (e.g., artificial neural networks, Bayesian statistics, support vector machines, decision trees, classifiers, k-nearest neighbor, etc.), unsupervised learning algorithms (e.g., artificial neural networks, association rule learning, hierarchical clustering, cluster analysis, etc.), semi-supervised learning algorithms, deep learning algorithms, etc.

Once an appropriate ML model has been trained, the ML component 404 can utilize data associated with a meeting to select a view template 118 suitable for a communication session. For instance, data associated with a communication such as, but not limited to, the participants, types of content to be rendered, and other types of metadata can be utilized to select an appropriate view template 118. Data 406 identifying the recommended view template 118 can then be transmitted to the meeting client application 106. A user 102 can then indicate whether the view template 118 is to be utilized during a particular communication session or during a recurring sequence of communication sessions.

Figure 5:
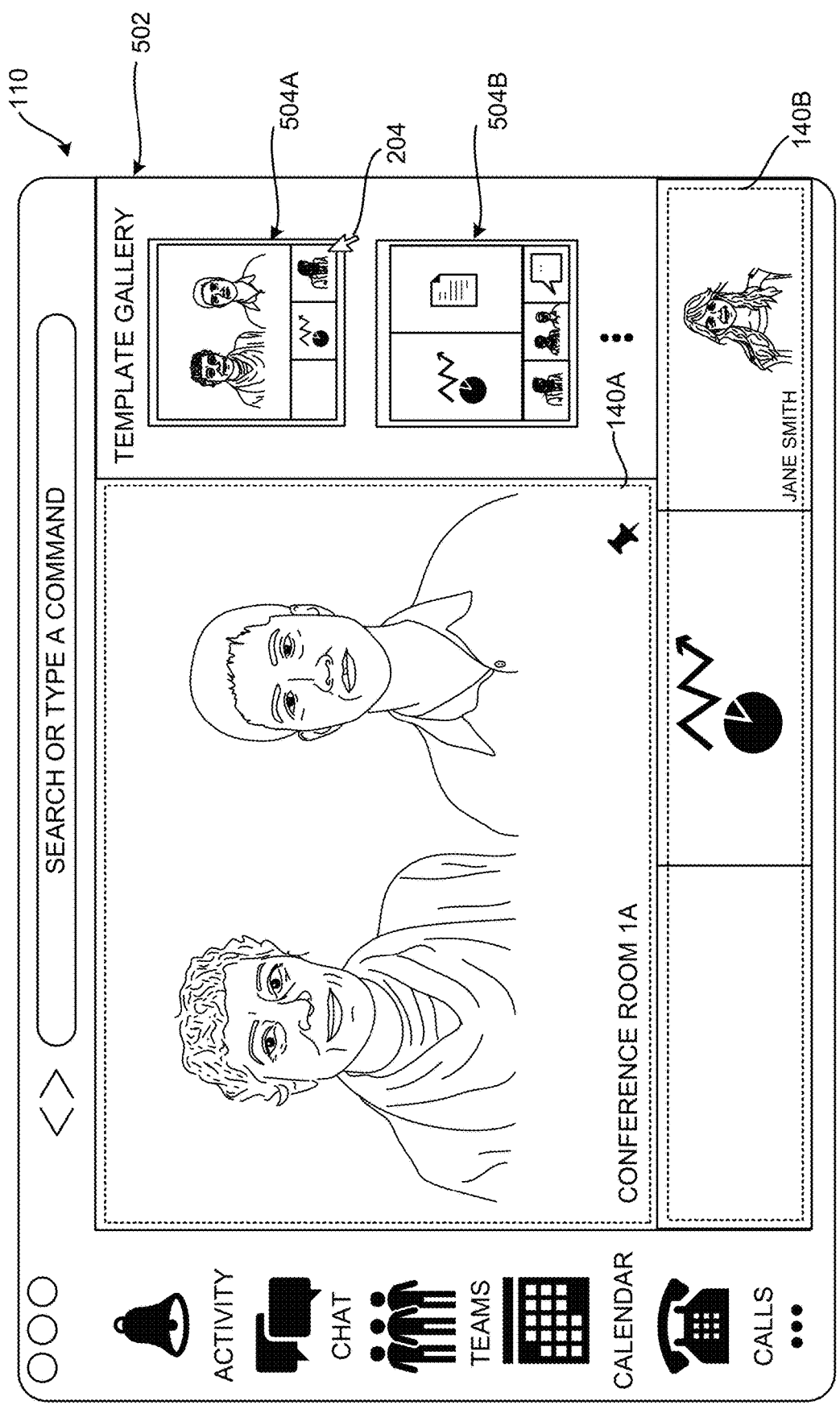
FIG. 5 illustrates an example scenario where a user can request a configuration of display areas within a primary display area using a template gallery.

A view template 118 might also be selected for use during a communication session through other types of UIs such as, for example, a UI that includes thumbnail images showing previews of available view templates 118. An example of such a UI 110 is shown in FIG. 5. In this example, the UI 110 includes a portion 502 (which might be referred to herein as the "template gallery 502") that is configured to present thumbnail images 504A-504B that show previews of the available view templates 118. The view templates 118 represented in the template gallery 502 can be selected using various mechanisms including, but not limited to, ML-based mechanisms such as that described above with regard to FIG. 4, data describing the historical use of view templates 118 by a user or group of users, the participants in or invited to a communication session, the type of content to be displayed, the roles or privileges associated with participants in a communication session, or other types of data.

In the example shown in FIG. 5, a view template 118 for a communication session can be chosen by selecting one of the thumbnail images 504A-504B. For instance, a user 102 might utilize an appropriate pointing device and the cursor 204 to select the thumbnail image 504A. In response thereto, the UI 110 can configure itself to present content shared during the communication session using the view template 118 that corresponds to the selected thumbnail image 504A.

Figure 6A:
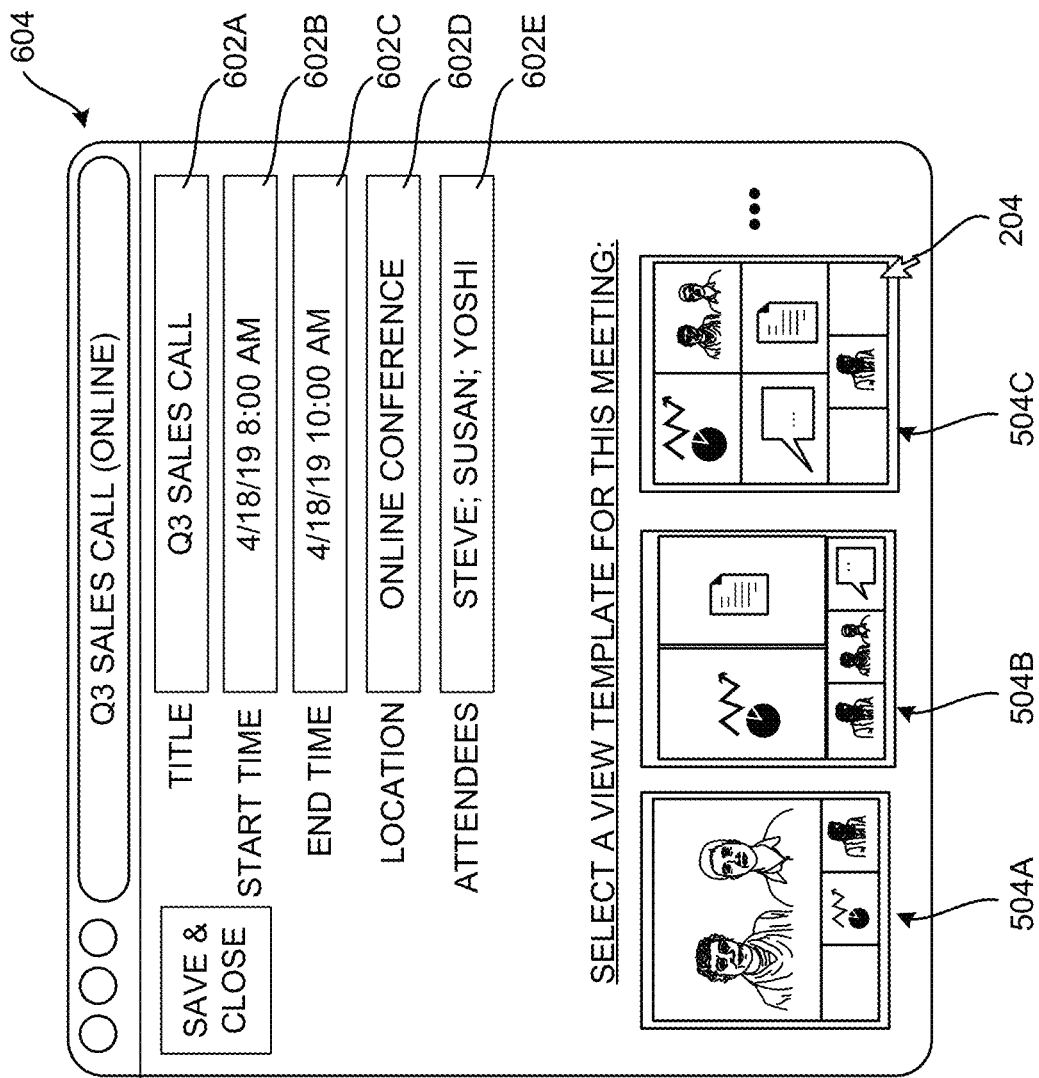
FIG. 6A illustrates an example scenario where a user can specify a configuration of display areas within a primary display area during the creation of a meeting invitation.

A view template 118 for a communication session can also be selected in a UI for defining an invitation to the communication session in some examples. In the example shown in FIG. 6A, for instance, a user 102 has initiated the presentation of a UI 604 for inviting other users to a communication session. Through the UI 604, the user 102 can define various aspects of a communication session such as, but not limited to, a title 602A of the communication session, the start time 602B and end time 602C of the communication session, the location 602D for the communication session (i.e. an online communication session as opposed to an in-person meeting), and the attendees 602E requested to participate in the communication session.

The UI 604 also includes UI features through which the user 102 can select a view template 118 for the communication session. For instance, in the illustrated example, the UI 604 includes thumbnail images 504A-504C showing previews of available view templates 118. As in the example described above, the view templates 118 represented by the thumbnail images 504A-504C can be selected using various mechanisms including, but not limited to, ML-based mechanisms such as that described above with regard to FIG. 4, data describing the historical use of view templates 118 by a user or group of users, the participants in or invited to a communication session, the type of content to be displayed, the roles or privileges associated with participants in a communication session, or other types of data.

A user 102 might utilize an appropriate pointing device and the cursor 204 to select the thumbnail image 504C. In response thereto, the meeting invitation that is generated by the UI 604 can be configured to specify the view template 118 corresponding to the selected thumbnail image 504C. Subsequently, the selected view template 118 can be utilized to configure the UI 110 for participants in the communication session.

Figure 6B:
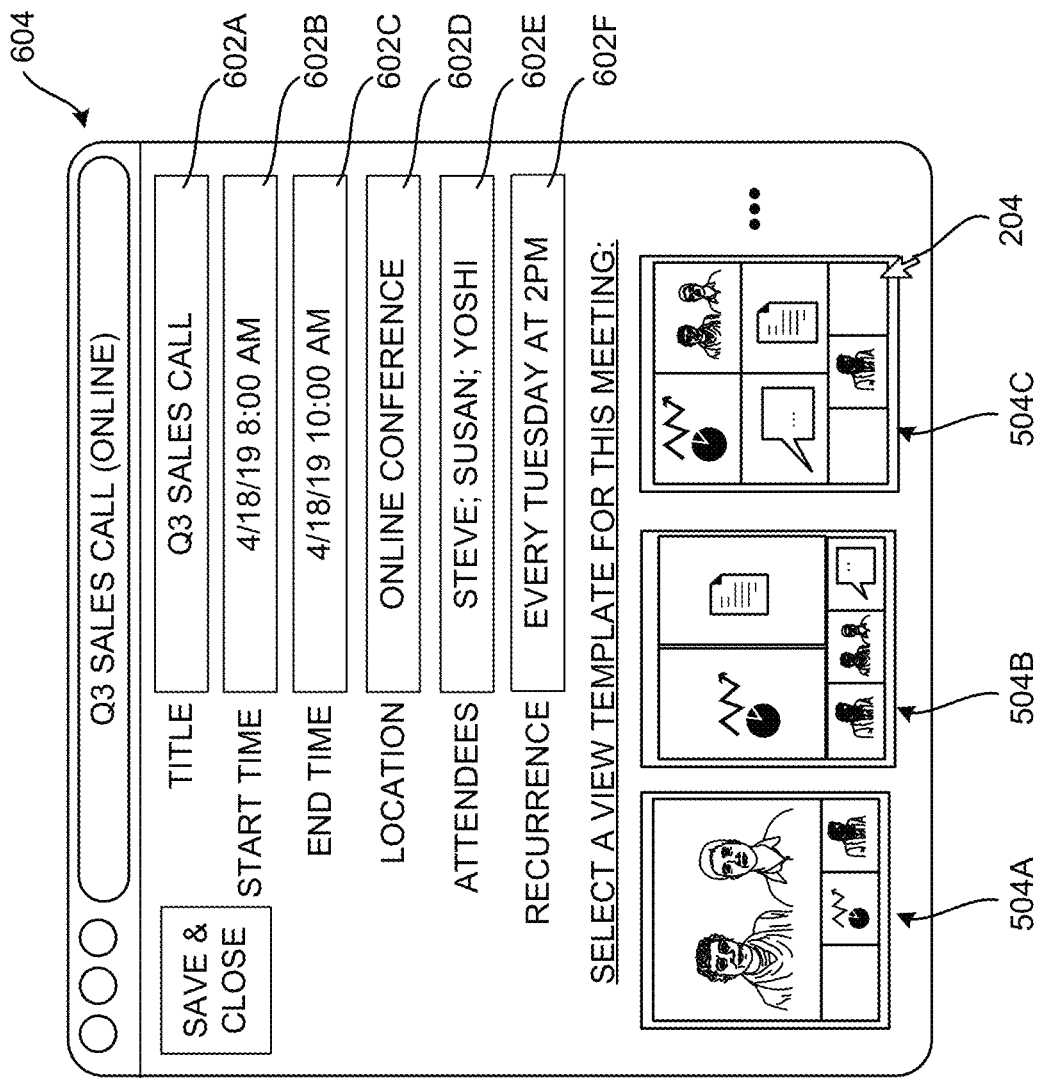
FIG. 6B illustrates an example scenario where a user can specify a configuration of display areas within a primary display area during the creation of a meeting invitation.

In the example shown in FIG. 6B, the UI 604 also includes a field for defining a recurrence 602F for the communication session. For instance, through the UI 604, a user can specify that a communication session recur according to a specified schedule such as, but not limited to, once a day, once a week, once a month, etc. In this example, the UI 604 allows the user to also select the view template 118 that is to be utilized during a recurring communication session. For instance, selection of the thumbnail image 504C will cause the corresponding view template 118 to be selected and utilized during each occurrence of a recurring communication session.

Figure 6C:
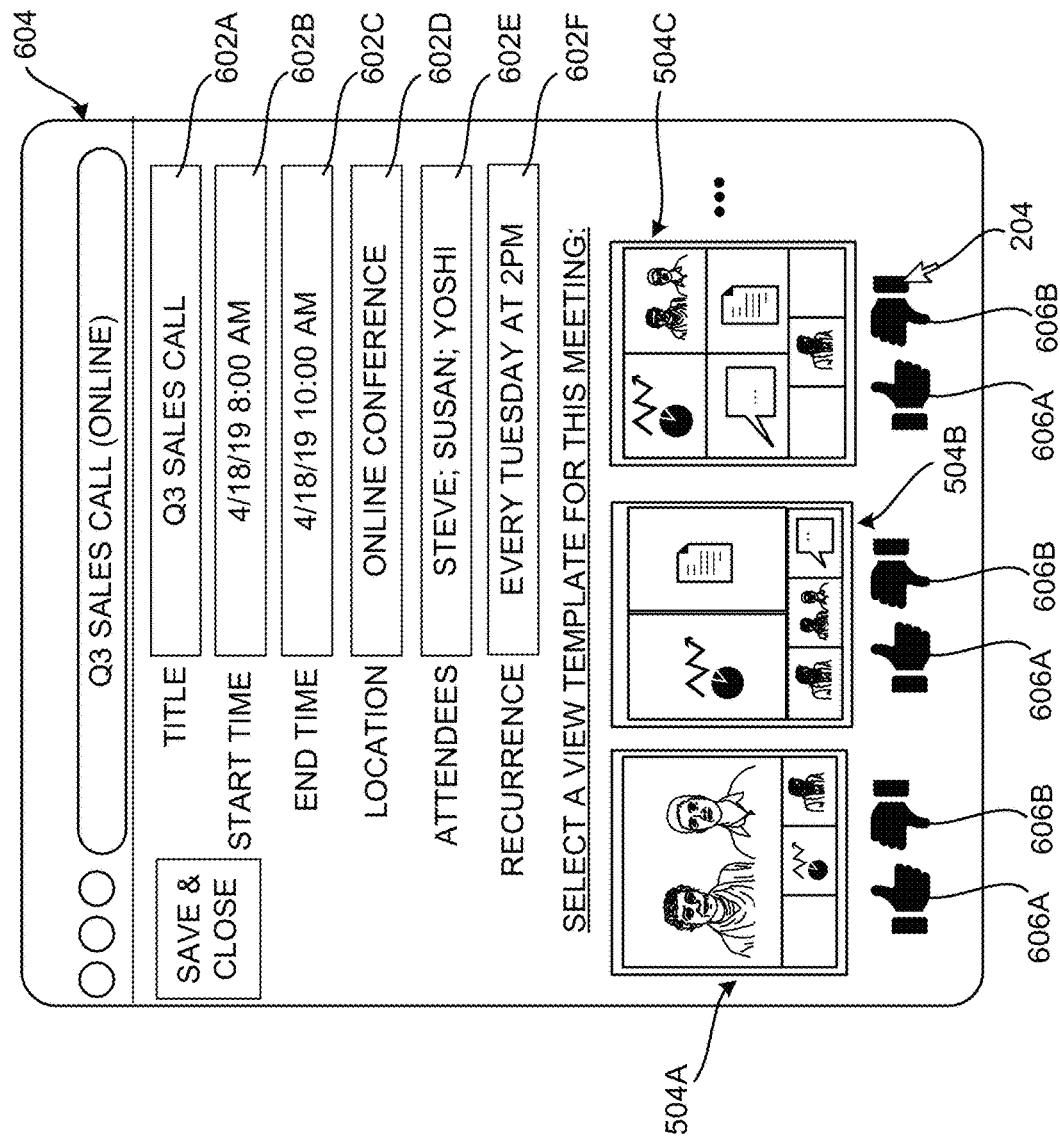
FIG. 6C illustrates an example scenario where a user can specify a configuration of display areas within a primary display area during the creation of a meeting invitation.

In the example shown in FIG. 6C, the UI 604 also includes UI controls 606A and 606B. These UI controls can be selected in order to up- or down-vote view templates 118 suggested for a particular communication session. For example, and without limitation, a user might select the UI control 606B under the thumbnail image 504C to indicate that the view template 118 corresponding to the thumbnail images 504C is not appropriate for the communication session being defined in the UI 604. In a similar way, the user might select the UI control 606A under the thumbnail image 504C to indicate that the view template 118 corresponding to the thumbnail images 504C is appropriate for the communication session being defined in the UI 604. Data describing the selection of the UI controls 606A and 606B can be provided to the ML component 404 described above in order to improve the ML model utilized to recommend view templates 118 for communication sessions.

Figure 6D:
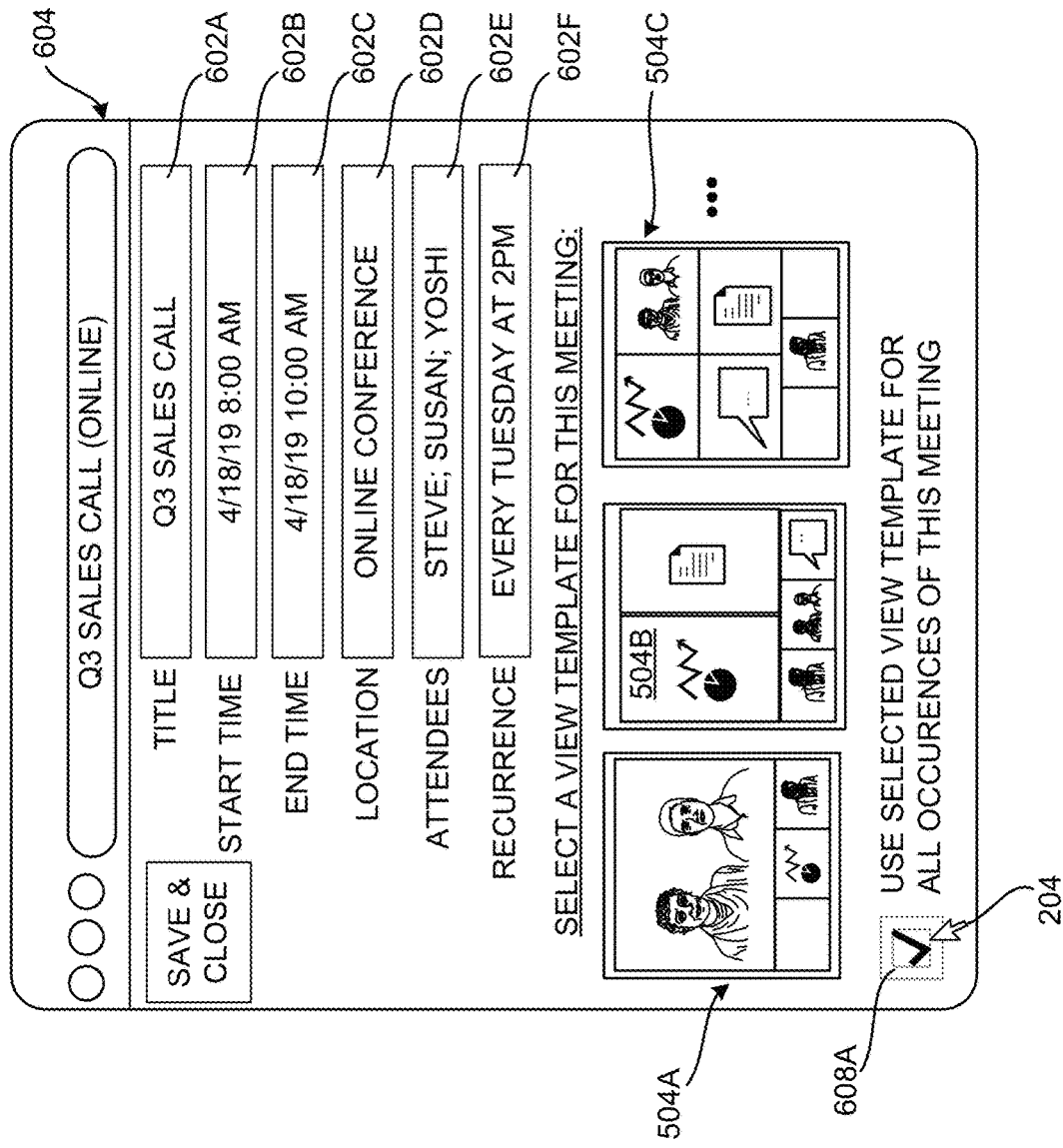
FIG. 6D illustrates an example scenario where a user can specify a configuration of display areas within a primary display area during the creation of a meeting invitation.

In the example shown in FIG. 6D, the UI 604 also includes a UI control 608A which, when selected, will cause the selected view template 118 (i.e. the view template 118 corresponding to the selected thumbnail image 504 in this example) to be made the default view template 118 for all occurrences of the communication session defined through the UI 604. In this way, the selected view template 118 can be utilized to provide a consistent view across individual instances of a recurring meeting.

Figure 6E:
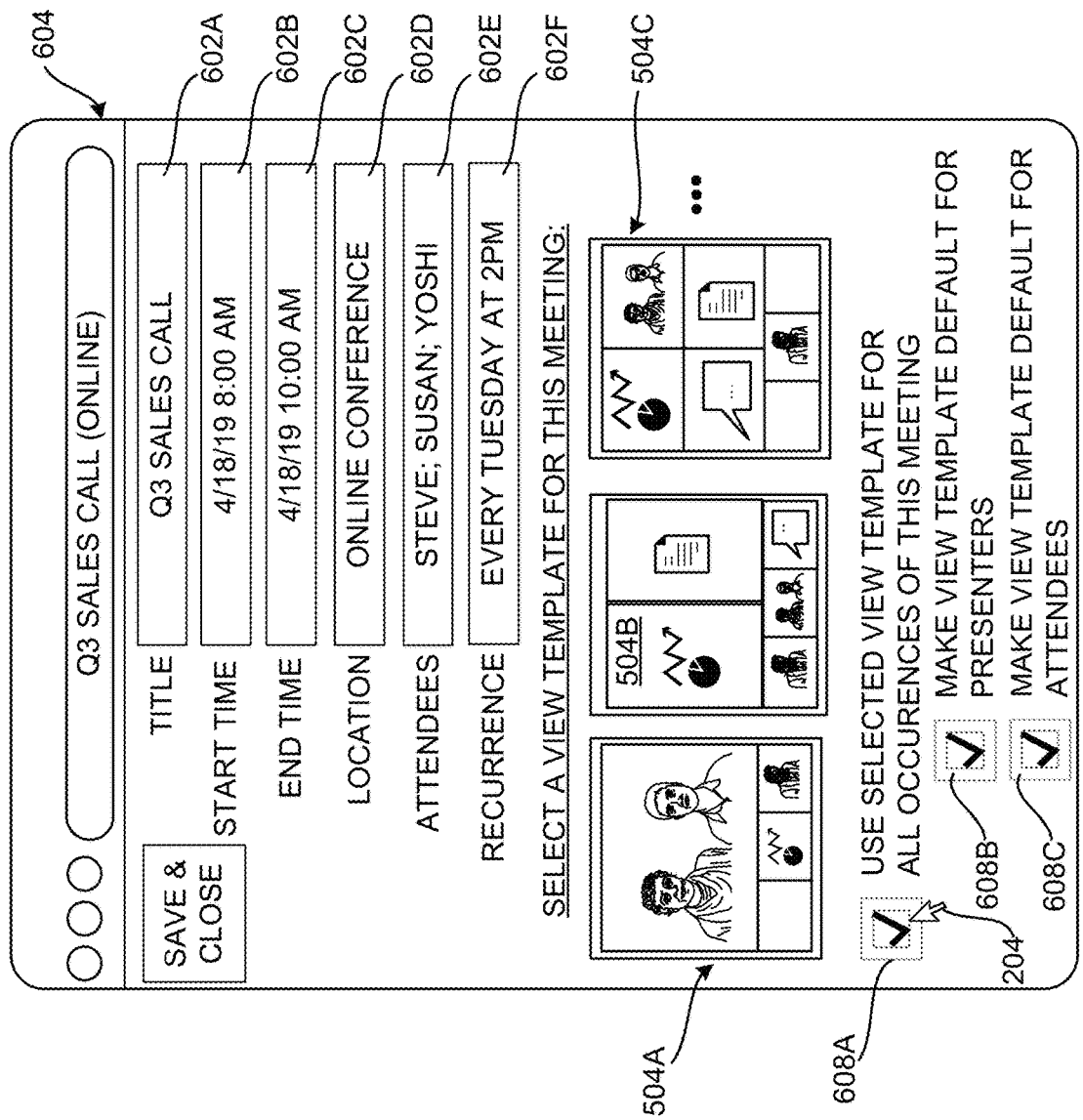
FIG. 6E illustrates an example scenario where a user can specify a configuration of display areas within a primary display area during the creation of a meeting invitation.

In other examples, such as that illustrated in FIG. 6E, the UI 604 includes UI controls 608B and 608C to specify that a selected view template 118 is to be the default template for presenters in a sequence of recurring communication sessions or for attendees in a sequence of recurring communication sessions. In this manner, a user can specify that a view template 118 is to be utilized during occurrences of a recurring communication session and identify those specific users for which the view template 118 is to be utilized.

Figure 7:
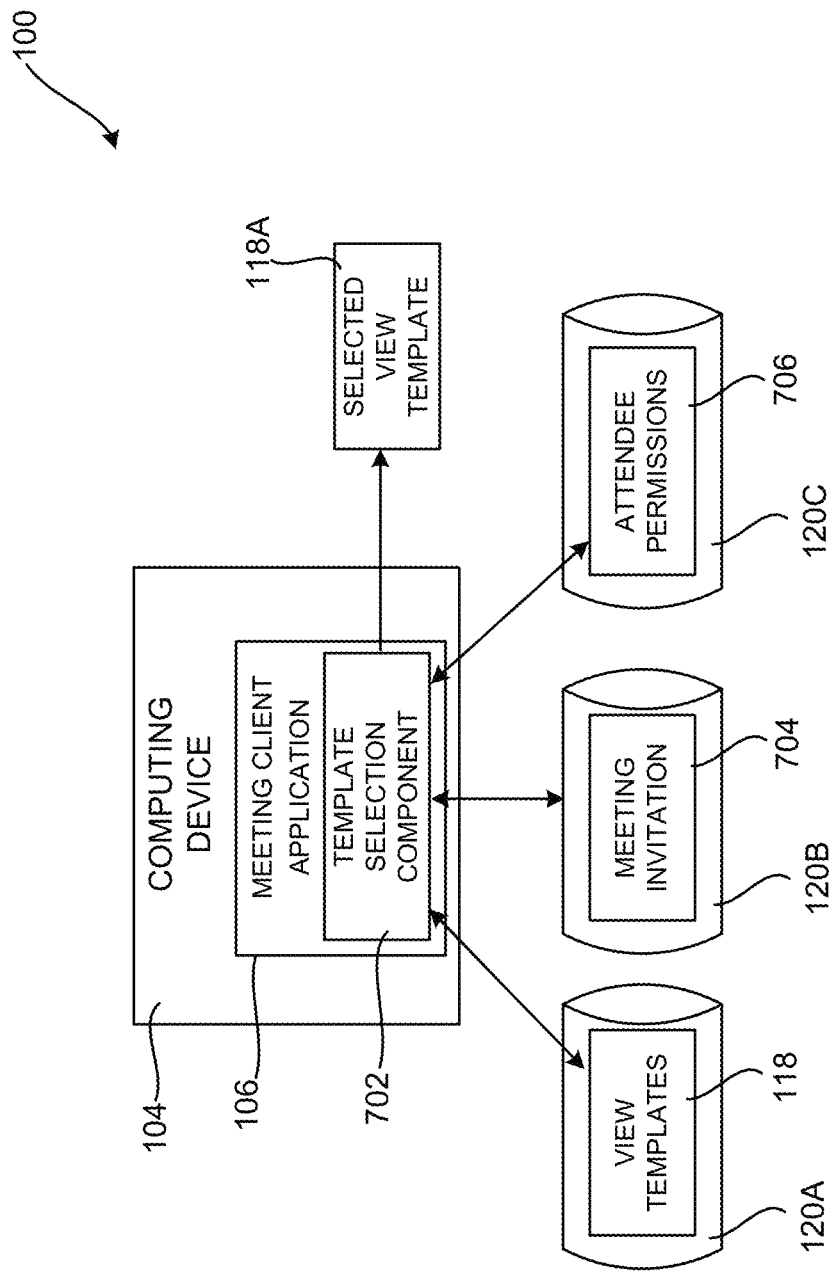
FIG. 7 illustrates a system that selects interaction models for use in communication sessions based upon attendee permissions.

Other types of data can be utilized to select a view template 118 for a communication session or a sequence of recurring communication sessions in other configurations. For instance, in the example shown in FIG. 7, the meeting client application 106 includes a template selection component 702 that can select a view template 118A for a communication session based upon various types of data including data in an invitation 704 to a communication session, such as data identifying the subject, attendees, attachments, or content associated with a single or recurring communication session. The template selection component 702 might also, or alternately, select a view template 118A for a particular communication session or sequence of communication sessions based upon the roles, permissions 706, and/or other data associated with the participants in the communication session. Other types of UIs, software components, systems, and data can be utilized to select a view template 118 for use during a communication session in other examples.

In other examples, a view template 118 for a communication session or sequence of communication sessions can be generated and/or selected based upon the configuration of the UIs 110 of participants in the communication session. In the example shown in FIG. 8A, for instance, the computing devices 104B and 104C utilized by participants 102 in a communication session generate view usage data 802 that describes the arrangement of the display areas 110B and 110C, including display areas 112 stationary within a primary display area 140A.

The view usage data 802 can be collected and utilized to generate and store a new view template 118 or to select an existing view template 118. In the example shown in FIG. 8, for instance, the computing device 104A collects the view usage data 802 from the computing devices 104B and 104C. The computing device 104A then analyzes the view usage data 802 to identify the arrangements of display areas 112 in use by the users 102B and 102C. Based upon this analysis, the computing device 104A then selects a view template 118 or creates a new view template 118. For example, a new view template 118 might be created that includes data defining an arrangement of display areas 112 in a UI 110 for a communication session, including stationary display areas 112, that is being used by a majority of the participants 102 in the communication session. The new view template 118 can be used during the same or different communication sessions.

Figure 8A:
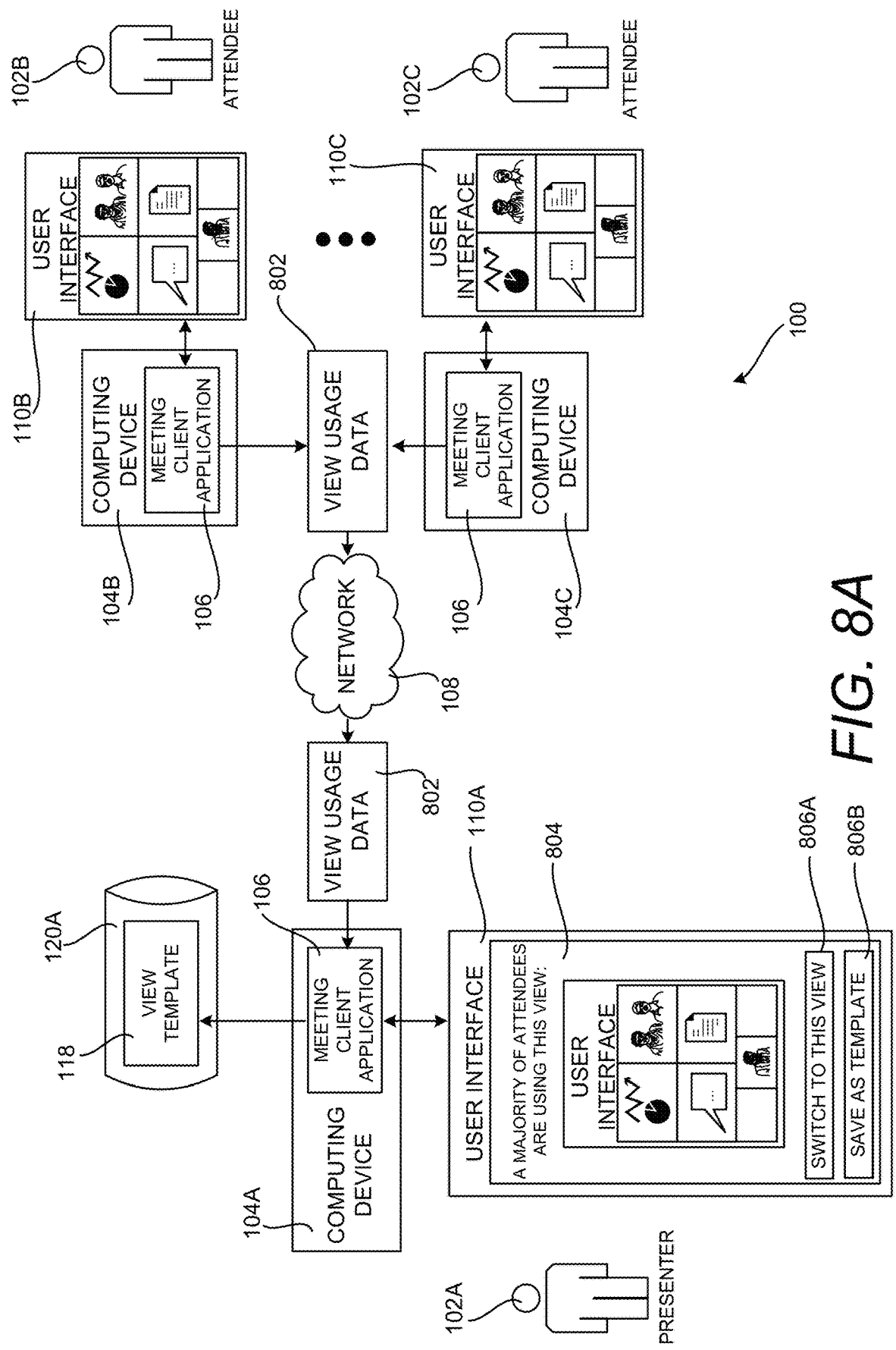
FIG. 8A illustrates a system that recommends interaction models for use in communication sessions based upon view usage data.

In the example shown in FIG. 8A, the UI 110A presents a view 804 showing a preview of the new view template 118. The new view template 118 in this case includes a layout of stationary display areas 118 that is the same as the layouts in use by the participants 102B and 102C. The user 102A might then select a UI control 806A to switch their display to the new view template 118 and/or a UI control 806B to save the new view template 118.

Figure 8D:
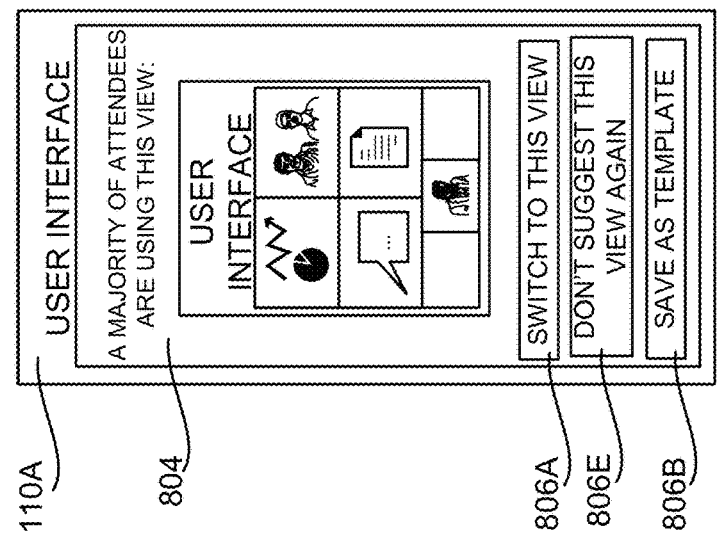
FIG. 8D illustrates a system that recommends interaction models for use in communication sessions based upon view usage data.
Figure 8C:
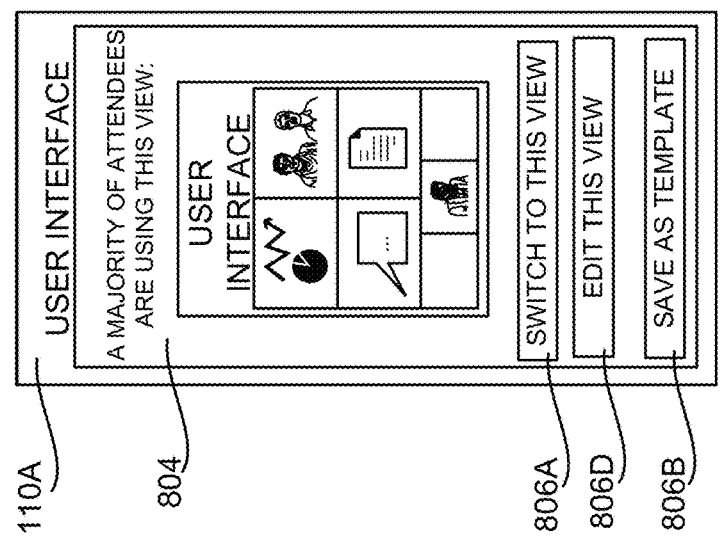
FIG. 8C illustrates a system that recommends interaction models for use in communication sessions based upon view usage data.
Figure 8B:
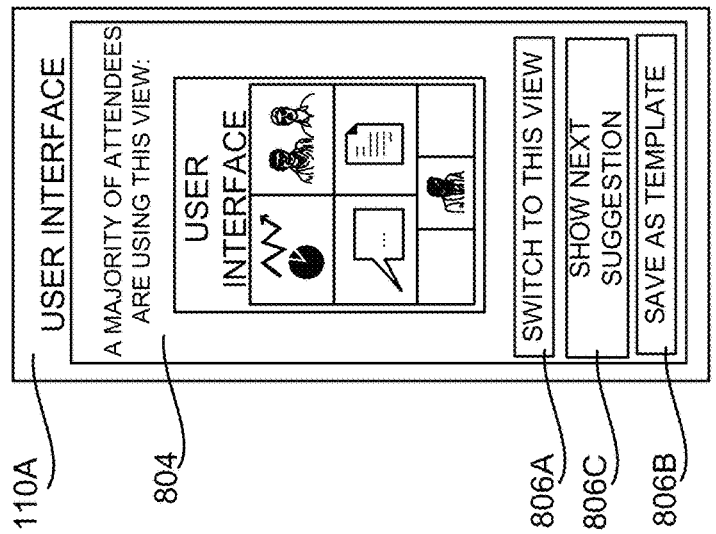
FIG. 8B illustrates a system that recommends interaction models for use in communication sessions based upon view usage data.

In another example, such as that shown in FIG. 8B, the UI 110A includes a UI control 806B which, when selected, will cause a preview of another new view template 118 to be presented in the UI 110A. The new view templates 118 might be generated in the manner described above by processing the view usage data 802 to identify an arrangement of display areas 112 suitable for all of the attendees 102 in the communication session. In the manner described above, a user might then select the UI control 806A to switch to the new view template 118.

In some examples, such as that shown in FIG. 8C, the UI 110A includes a UI control 806D which, when selected, will provide a UI through which a user can edit the view 804. For example, the UIs discussed above with regard to FIGS. 2A-2H might be utilized to edit the suggested view. The user might then switch to the edited view or save a view template 118 that includes data defining the edited view in the manner described above.

In some examples, such as that shown in FIG. 8D, the UI 110A includes UI controls that can be selected in order to up- or down-vote the view suggested for a particular communication session. For example, and without limitation, a user might select a UI control 806E to indicate that a suggested view template 118 corresponding to the thumbnail images 504C is not appropriate for a communication session and should not be suggested again. Data describing the selection of the UI control 806E can be provided to the ML component 404 described above in order to improve the ML model utilized to recommend view templates 118 for communication sessions. In a similar way, data describing the selection of the UI control 806A (i.e. data indicating that a user selected a recommended view for a communication session) can be provided to the ML component 404 described above in order to improve the ML model utilized to recommend view templates 118 for communication sessions.

In some examples, view templates 118 can be recommended based upon the eye gaze of one or more participants in a communication session. For example, and without limitation, user computing devices 104 can be equipped with hardware for detecting the eye gaze of the users. In this way, the portion of the UI 110 being looked at by each user during a communication session can be identified. A view template 118 can then be selected or created based upon the user's eye gaze. For instance, if multiple users 102 are looking at a particular type of content, that content might be made stationary within the UI. Data describing the eye gaze or participants in a communication session can also be provided to the ML system described above for use in training a ML model for recommending view templates 118.

As described briefly above, a view template 118 can include data that imposes restrictions on the manner in which the view template 118 can be utilized. For example, a view template 118 can specify that only a subset of the stationary display areas 112 in an arrangement of display areas 112 in the UI 110 are to be presented to certain participants in a communication session. The subset of display areas 112 can be selected manually or based upon user roles, permissions, or other types of data. In this way, a user 102A defining a view template 118 can limit the display areas 112 that are presented to other participants 102 in a communication session or a sequence of recurring communication sessions. A view template 118 might also, or alternately, identify those users 102 that are authorized to use the view template 118 to render the arrangement of the display areas 112 on their computing devices 104.

Figure 9:
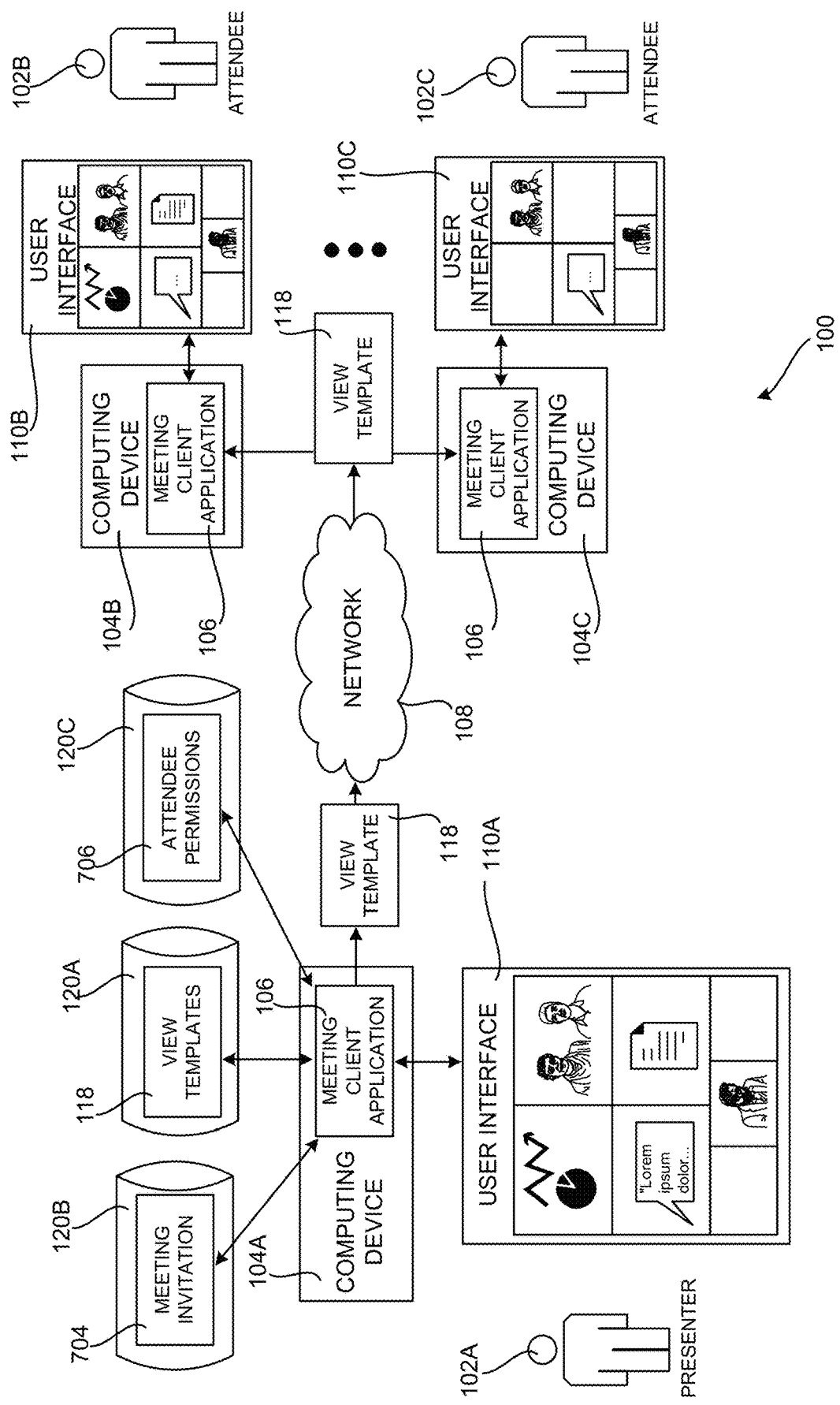
FIG. 9 illustrates a system that customizes interaction models for use in communication sessions based upon attendee permissions.

In the example shown in FIG. 9, for instance, a user 102A has created a view template 118 for a communication session or sequence of recurring communication sessions with the users 102B and 102C. The user 102A has also specified during creation of the view template 118 that all of the display areas 112 are to be presented to the user 102B but that only a subset of the display areas 112 are to be presented to the user 102C.

The computing device 104A transmits the view template 118 to the meeting client application 106 executing on the computing devices 104B and 104C. The meeting client application 106 executing on the computing device 104B uses the view template 118 to generate the UI 110B shown to the user 102B. Because the view template 118 indicates that the user 102B is authorized to see all of the stationary display areas 112, the meeting client application 106 shows all of the stationary display areas 112 in the UI 110B.

The meeting client application 106 executing on the computing device 104C uses the view template 118 to generate the UI 110C that is shown to the user 102C. Because the view template 118 indicates that the user 102C is authorized to see only a subset of the stationary display areas 112, the meeting client application 106 executing on the computing device 104C shows only the subset of the stationary display areas 112 in the UI 110B that the user 102C is authorized to view. In this case, display areas 112 showing a graph and a document are not shown to the user 102C.

In a similar way to that described with regard to FIG. 9, a user 102 defining a view template 118 can also specify that certain users 102 are not permitted to modify the arrangement of the stationary display areas 112 in a UI 110 defined by the view template 118. The users 102 can be selected manually or based upon roles, permissions, or other data. In this way, a user 102 defining a view template 118 can ensure that the arrangement of stationary display areas 112 in a UI 110 presented using the view template 118 will be rendered consistently to all or only a portion of the participants 102 in a communication session.

Figure 10:
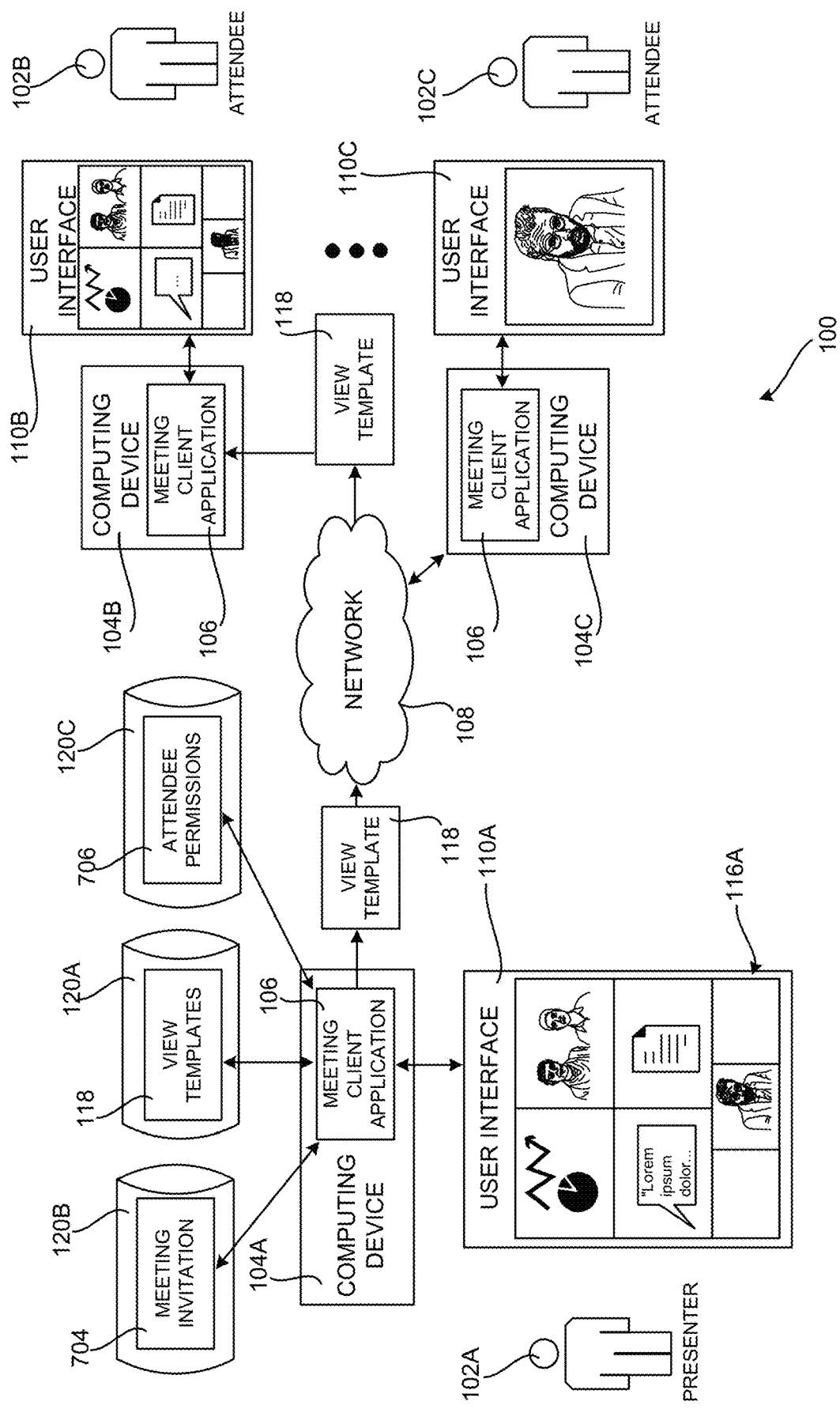
FIG. 10 illustrates a system that customizes interaction models for use in communication sessions based upon attendee permissions.

In the example shown in FIG. 10, for instance, a user 102A has created a view template 118 for a communication session or sequence of recurring communication sessions with the users 102B and 102C. The user 102A has also specified during creation of the view template 118 that the user 102C is permitted to modify the arrangement of display areas 112 in the UI 110 generated using the view template 118 but the user 102B is not.

As in the example above, the computing device 104A transmits the view template 118 to the meeting client application 106 executing on the computing devices 104B and 104C. The meeting client application 106 executing on the computing device 104B uses the view template 118 to generate the UI 110B shown to the user 102B. Because the view template 118 indicates that the user 102B is not authorized to modify the view template 118, the user 102B is presented with the arrangement of stationary display areas 112 defined by the view template 118 and is not permitted to modify the arrangement.

The meeting client application 106 executing on the computing device 104C uses the view template 118 to generate the UI 110C that is shown to the user 102C. Because the view template 118 indicates that the user 102C is authorized to modify the arrangement of stationary display areas 112 defined by the view template 118, the user 102C can modify the arrangement of the display areas 112. In this example, the user 102C has modified the arrangement such that only a single display area 112 is presented. The user 102C can modify the arrangement of display areas 112 in other ways in other examples.

Figure 11:
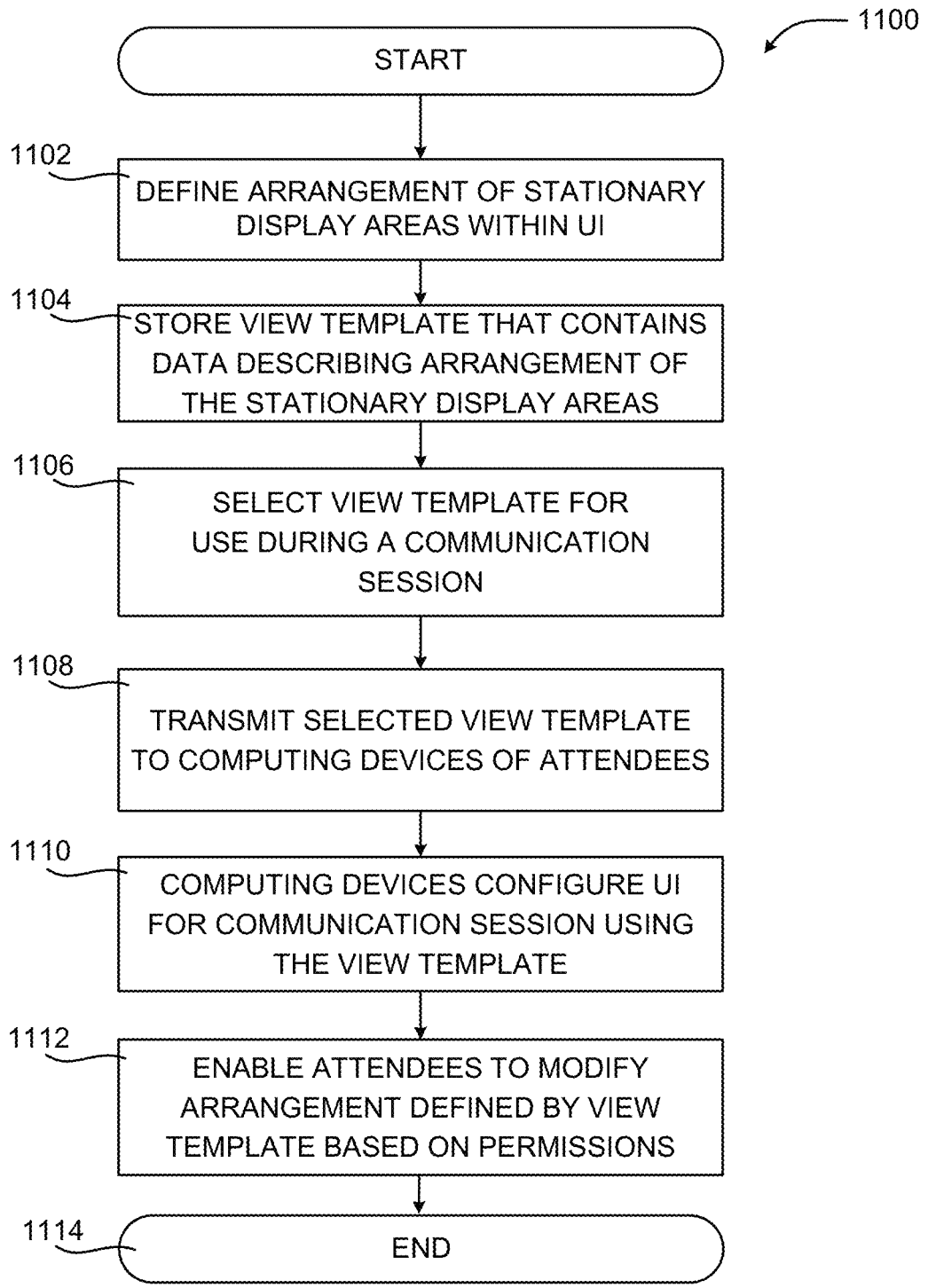
FIG. 11 is a flow diagram illustrating aspects of a routine for providing consistent interaction models in communication sessions.

FIG. 11 is a diagram illustrating aspects of a routine 1100 for providing consistent interaction models during communication sessions. It should be understood by those of ordinary skill in the art that the operations of the methods disclosed herein are not necessarily presented in any particular order and that performance of some or all of the operations in another order is possible and is contemplated. The operations have been presented in the demonstrated order for ease of description and illustration. Operations may be added, omitted, performed together, and/or performed simultaneously, without departing from the scope of the appended claims.

It should also be understood that the illustrated methods can end at any time and need not be performed in their entireties. Some or all operations of the methods, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented 1) as a sequence of computer implemented acts or program modules running on a computing system such as those described herein and/or 2) as interconnected machine logic circuits or circuit modules within the computing system. The implementation is a matter of choice dependent on the performance and other requirements of the computing system. Accordingly, the logical operations may be implemented in software, in firmware, in special purpose digital logic, and any combination thereof.

Additionally, the operations illustrated in FIG. 11 and the other FIGURES can be implemented in association with the example presentation UIs described above. For instance, the various devices and/or modules described herein can generate, transmit, receive, and/or display data associated with content of a communication session e.g., live content, broadcasted event, recorded content, etc. and/or a presentation UI that includes renderings of one or more participants of remote computing devices, avatars, channels, chat sessions, video streams, images, virtual objects, and/or applications associated with a communication session.

The routine 1100 begins at operation 1102, where a user 102 can define an arrangement of stationary display areas 112 in a UI 110 such as in the manner described above with regard to FIGS. 2A-2H. As discussed above, other mechanisms can be utilized to specify that display areas 112 are to be stationary within the primary display area 140A of the UI 110 in other examples.

From operation 1102, the routine 1100 proceeds to operation 1104, where a view template 118 can be stored. As discussed above, the view template 118 includes data that describes the arrangement of the stationary display areas 118 within the primary display area 140A of the UI 110. As also described above, the view template 118 can include other types of data in other examples.

The routine 1100 then proceeds from operation 1104 to operation 1106, where a user 102 can select a view template 118 for use during a communication session or a sequence of recurring communication sessions. The view template 118 can be selected in various ways, such as those described above with regard to FIGS. 4-8. Other mechanisms can be utilized to select a view template 118 for a communication session in other examples.

Once the user 102 has selected a view template at operation 1106, the selected view template 118 is transmitted to other computing devices 104 in the communication session (e.g. a single occurrence of a recurring communication session) in some examples. As discussed above with regard to FIG. 1B, the other computing devices 104 can utilize the view template 118 to generate a UI 110 that includes an arrangement of stationary display areas 112 defined by the view template 118. In this way, each of the participants in a communication session can be presented with the same arrangement of stationary display areas 112. The computing devices 104 configure the UI 110 in this manner at operation 1110.

From operation 1110, the routine 1100 proceeds to operation 1112, where the participants in the communication session can take various types of actions based upon roles or permissions defined by the view template 118. For instance, and as described above with regard to FIG. 9, the users 102 might be permitted (or prohibited) to modify the arrangement of the stationary display areas 112 in the primary display area 140A of the UI 110. The users 102 can perform other types of actions with respect to the stationary display areas 112 in other examples. From operation 1112, the routine 1100 proceeds to operation 1114, where it ends.

It should be appreciated that the above-described subject matter may be implemented as a computer-controlled apparatus, a computer process, a computing system, or as an article of manufacture such as a computer-readable storage medium. The operations of the example methods are illustrated in individual blocks and summarized with reference to those blocks. The methods are illustrated as logical flows of blocks, each block of which can represent one or more operations that can be implemented in hardware, software, or a combination thereof. In the context of software, the operations represent computer-executable instructions stored on one or more computer-readable media that, when executed by one or more processors, enable the one or more processors to perform the recited operations.

Generally, computer-executable instructions include routines, programs, objects, modules, components, data structures, and the like that perform particular functions or implement particular abstract data types. The order in which the operations are described is not intended to be construed as a limitation, and any number of the described operations can be executed in any order, combined in any order, subdivided into multiple sub-operations, and/or executed in parallel to implement the described processes. The described processes can be performed by resources associated with one or more device(s) such as one or more internal or external CPUs or GPUs, and/or one or more pieces of hardware logic such as field-programmable gate arrays ("FPGAs"), digital signal processors ("DSPs"), or other types of accelerators.

All of the methods and processes described above may be embodied in, and fully automated via, software code modules executed by one or more general purpose computers or processors. The code modules may be stored in any type of computer-readable storage medium or other computer storage device, such as those described below. Some or all of the methods may alternatively be embodied in specialized computer hardware, such as that described below.

Any routine descriptions, elements or blocks in the flow diagrams described herein and/or depicted in the attached figures should be understood as potentially representing modules, segments, or portions of code that include one or more executable instructions for implementing specific logical functions or elements in the routine. Alternate implementations are included within the scope of the examples described herein in which elements or functions may be deleted, or executed out of order from that shown or discussed, including substantially synchronously or in reverse order, depending on the functionality involved as would be understood by those skilled in the art.

Figure 12:
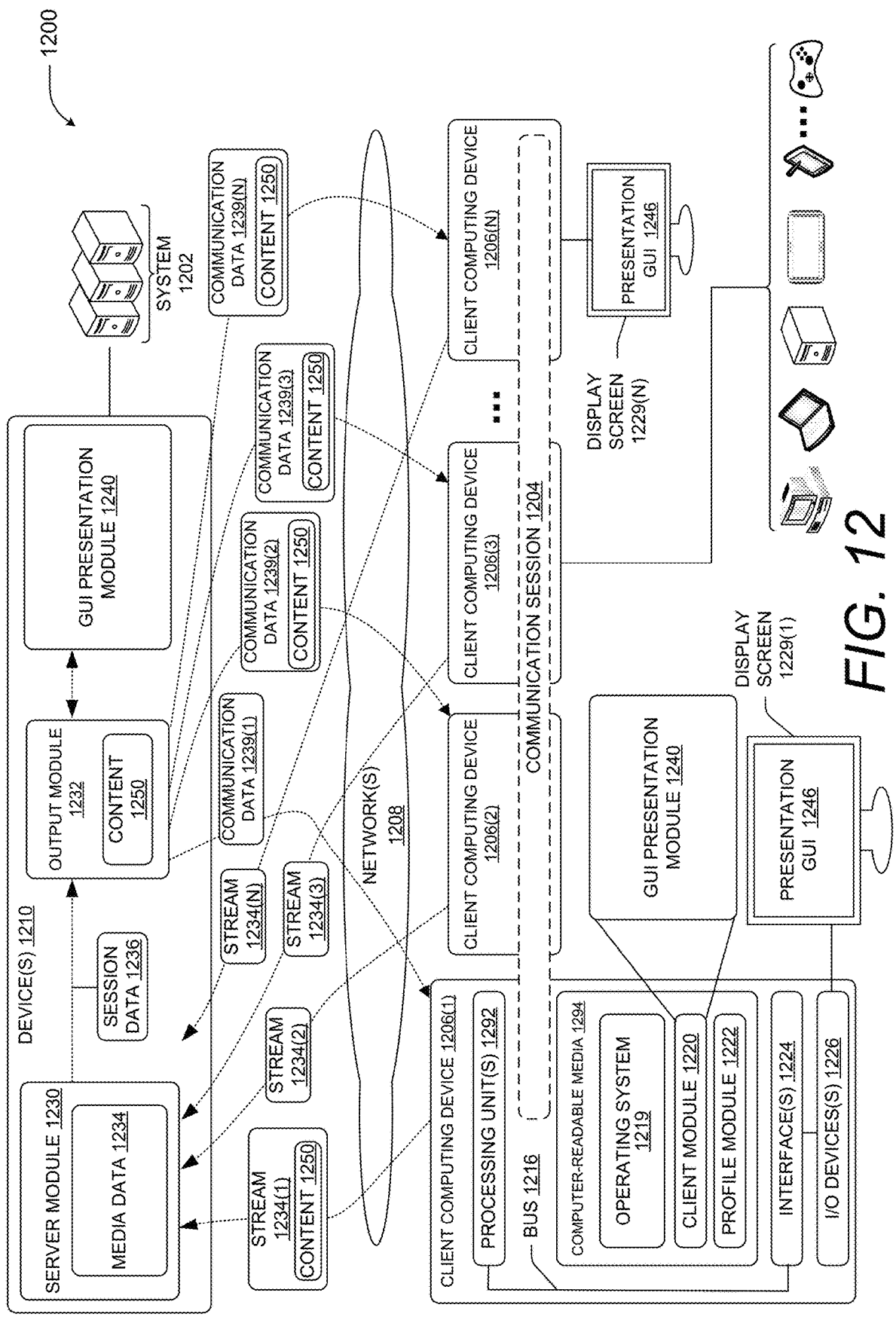
FIG. 12 is a computing system diagram showing aspects of an illustrative operating environment for the technologies disclosed herein.

FIG. 12 is a network and computer architecture diagram illustrating an example environment 1200 in which a system 1202 (such as the system 100 of FIG. 1) can implement the technologies disclosed herein. In some implementations, a system 1202 may function to collect, analyze, and share data defining one or more objects that are displayed to users of a communication session 1204.

As illustrated, the communication session 1204 may be implemented between a number of client computing devices 1206(1) through 1206(N) (where N is a number having a value of two or greater) that are associated with the system 1202 or are part of the system 1202. The client computing devices 1206(1) through 1206(N) enable users, also referred to as participants, to participate in the communication session 1204.

In this example, the communication session 1204 is hosted, over one or more network(s) 1208, by the system 1202. That is, the system 1202 can provide a service that enables users of the client computing devices 1206(1) through 1206(N) to participate in the communication session 1204 (e.g., via a live viewing and/or a recorded viewing). Consequently, a "participant" to the communication session 1204 can comprise a user and/or a client computing device (e.g., multiple users may be in a room participating in a communication session via the use of a single client computing device), each of which can communicate with other participants. As an alternative, the communication session 1204 can be hosted by one of the client computing devices 1206(1) through 1206(N) utilizing peer-to-peer technologies. The system 1202 can also host chat conversations and other team collaboration functionality (e.g., as part of an application suite).

In some implementations, such chat conversations and other team collaboration functionality are considered external communication sessions distinct from the communication session 1204. A computerized agent configured to collect participant data in the communication session 1204 may be able to link to such external communication sessions. Therefore, the computerized agent may receive information, such as date, time, session particulars, and the like, that enables connectivity to such external communication sessions. In one example, a chat conversation can be conducted in accordance with the communication session 1204. Additionally, the system 1202 may host the communication session 1204, which can include participants co-located at a meeting location, such as a meeting room or auditorium, or located in disparate locations.

The system 1202 includes device(s) 1210. The device(s) 1210 and/or other components of the system 1202 can include distributed computing resources that communicate with one another and/or with the client computing devices 1206(1) through 1206(N) via the one or more network(s) 1208. In some examples, the system 1202 may be an independent system that is tasked with managing aspects of one or more communication sessions such as communication session 1204. As an example, the system 1202 may be managed by entities such as SLACK, CHIME, ZOOM, WEBEX, GOTOMEETING, GOOGLE HANGOUTS, etc.

Network(s) 1208 may include, for example, public networks such as the Internet, private networks such as an institutional and/or personal intranet, or some combination of private and public networks. Network(s) 1208 may also include any type of wired and/or wireless network, including but not limited to local area networks ("LANs"), wide area networks ("WANs"), satellite networks, cable networks, Wi-Fi networks, WiMAX networks, mobile communications networks (e.g., 3G, 4G, and so forth) or any combination thereof.

Network(s) 1208 may utilize communications protocols, including packet-based and/or datagram-based protocols such as Internet protocol ("IP"), transmission control protocol ("TCP"), user datagram protocol ("UDP"), or other types of protocols. Moreover, network(s) 1208 may also include a number of devices that facilitate network communications and/or form a hardware basis for the networks, such as switches, routers, gateways, access points, firewalls, base stations, repeaters, backbone devices, and the like.

In some examples, network(s) 1208 may further include devices that enable connection to a wireless network, such as a wireless access point ("WAP"). Examples support connectivity through WAPs that send and receive data over various electromagnetic frequencies (e.g., radio frequencies), including WAPs that support Institute of Electrical and Electronics Engineers ("IEEE") 802.11 standards (e.g., 802.11g, 802.11n, 802.11ac and so forth), and other standards.

In various examples, device(s) 1210 may include one or more computing devices that operate in a cluster or other grouped configuration to share resources, balance load, increase performance, provide fail-over support or redundancy, or for other purposes. For instance, device(s) 1210 may belong to a variety of classes of devices such as traditional server-type devices, desktop computer-type devices, and/or mobile-type devices. Thus, although illustrated as a single type of device or a server-type device, device(s) 1210 may include a diverse variety of device types and are not limited to a particular type of device. Device(s) 1210 may represent, but are not limited to, server computers, desktop computers, web-server computers, personal computers, mobile computers, laptop computers, tablet computers, or any other sort of computing device.

A client computing device (e.g., one of client computing device(s) 1206(1) through 1206(N)) may belong to a variety of classes of devices, which may be the same as, or different from, device(s) 1210, such as traditional client-type devices, desktop computer-type devices, mobile-type devices, special purpose-type devices, embedded-type devices, and/or wearable-type devices. Thus, a client computing device can include, but is not limited to, a desktop computer, a game console and/or a gaming device, a tablet computer, a personal data assistant ("PDA"), a mobile phone/tablet hybrid, a laptop computer, a telecommunication device, a computer navigation type client computing device such as a satellite-based navigation system including a global positioning system ("GPS") device, a wearable device, a virtual reality ("VR") device, an augmented reality ("AR") device, an implanted computing device, an automotive computer, a network-enabled television, a thin client, a terminal, an Internet of Things ("IoT") device, a work station, a media player, a personal video recorder ("PVR"), a set-top box, a camera, an integrated component (e.g., a peripheral device) for inclusion in a computing device, an appliance, or any other sort of computing device. Moreover, the client computing device may include a combination of the earlier listed examples of the client computing device such as, for example, desktop computer-type devices or a mobile-type device in combination with a wearable device, etc.

Client computing device(s) 1206(1) through 1206(N) of the various classes and device types can represent any type of computing device having one or more data processing unit(s) 1292 operably connected to computer-readable media 1294 such as via a bus 1216, which in some instances can include one or more of a system bus, a data bus, an address bus, a PCI bus, a Mini-PCI bus, and any variety of local, peripheral, and/or independent buses.

Executable instructions stored on computer-readable media 1294 may include, for example, an operating system 1219, a client module 1220, a profile module 1222, and other modules, programs, or applications that are loadable and executable by data processing units(s) 1292.

Client computing device(s) 1206(1) through 1206(N) may also include one or more interface(s) 1224 to enable communications between client computing device(s) 1206(1) through 1206(N) and other networked devices, such as device(s) 1210, over network(s) 1208. Such network interface(s) 1224 may include one or more network interface controllers (NICs) or other types of transceiver devices to send and receive communications and/or data over a network.

Client computing device(s) 1206(1) through 1206(N) can include input/output ("I/O") interfaces (devices) 1226 that enable communications with input/output devices such as user input devices including peripheral input devices (e.g., a game controller, a keyboard, a mouse, a pen, a voice input device such as a microphone, a video camera for obtaining and providing video feeds and/or still images, a touch input device, a gestural input device, and the like) and/or output devices including peripheral output devices (e.g., a display, a printer, audio speakers, a haptic output device, and the like). FIG. 12 illustrates that client computing device 1206(1) is in some way connected to a display device (e.g., a display screen 1229(1)), which can display a UI according to the technologies described herein.

In the example environment 1200 of FIG. 12, client computing devices 1206(1) through 1206(N) may use their respective client modules 1220 to connect with one another and/or other external device(s) in order to participate in the communication session 1204, or in order to contribute activity to a collaboration environment. For instance, a first user may utilize a client computing device 1206(1) to communicate with a second user of another client computing device 1206(2). When executing client modules 1220, the users may share data, which may cause the client computing device 1206(1) to connect to the system 1202 and/or the other client computing devices 1206(2) through 1206(N) over the network(s) 1208.

The client computing device(s) 1206(1) through 1206(N) may use their respective profile modules 1222 to generate participant profiles (not shown in FIG. 12) and provide the participant profiles to other client computing devices and/or to the device(s) 1210 of the system 1202. A participant profile may include one or more of an identity of a user or a group of users (e.g., a name, a unique identifier ("ID"), etc.), user data such as personal data, machine data such as location (e.g., an IP address, a room in a building, etc.) and technical capabilities, etc. Participant profiles may be utilized to register participants for communication sessions.

As shown in FIG. 12, the device(s) 1210 of the system 1202 include a server module 1230 and an output module 1232. In this example, the server module 1230 is configured to receive, from individual client computing devices such as client computing devices 1206(1) through 1206(N), media streams 1234(1) through 1234(N).

As described above, media streams can comprise a video feed (e.g., audio and visual data associated with a user), audio data which is to be output with a presentation of an avatar of a user (e.g., an audio only experience in which video data of the user is not transmitted), text data (e.g., text messages), file data and/or screen sharing data (e.g., a document, a slide deck, an image, a video displayed on a display screen, etc.), and so forth. Thus, the server module 1230 is configured to receive a collection of various media streams 1234(1) through 1234(N) during a live viewing of the communication session 1204 (the collection being referred to herein as "media data 1234").

In some scenarios, not all of the client computing devices that participate in the communication session 1204 provide a media stream. For example, a client computing device may only be a consuming, or a "listening", device such that it only receives content associated with the communication session 1204 but does not provide any content to the communication session 1204.

In various examples, the server module 1230 can select aspects of the media streams 1234 that are to be shared with individual ones of the participating client computing devices 1206(1) through 1206(N). Consequently, the server module 1230 may be configured to generate session data 1236 based on the streams 1234 and/or pass the session data 1236 to the output module 1232. Then, the output module 1232 may communicate communication data 1239 to the client computing devices (e.g., client computing devices 1206(1) through 1206(N) participating in a live viewing of the communication session). The communication data 1239 may include video, audio, and/or other content data, provided by the output module 1232 based on content 1250 associated with the output module 1232 and based on received session data 1236.

As shown, the output module 1232 transmits communication data 1239(1) to client computing device 1206(1), and transmits communication data 1239(2) to client computing device 1206(2), and transmits communication data 1239(3) to client computing device 1206(3), etc. The communication data 1239 transmitted to the client computing devices can be the same or can be different (e.g., positioning of streams of content within a user interface may vary from one device to the next).

In various implementations, the device(s) 1210 and/or the client module 1220 can include GUI presentation module 1240. The GUI presentation module 1240 may be configured to analyze communication data 1239 that is for delivery to one or more of the client computing devices 1206. Specifically, the UI presentation module 1240, at the device(s) 1210 and/or the client computing device 1206, may analyze communication data 1239 to determine an appropriate manner for displaying video, image, and/or content on the display screen 1229 of an associated client computing device 1206.

In some implementations, the GUI presentation module 1240 may provide video, images, and/or content to a presentation GUI 1246 rendered on the display screen 1229 of the associated client computing device 1206. The presentation GUI 1246 may be caused to be rendered on the display screen 1229 by the GUI presentation module 1240. The presentation GUI 1246 may include the video, images, and/or content analyzed by the GUI presentation module 1240.

Figure 13:
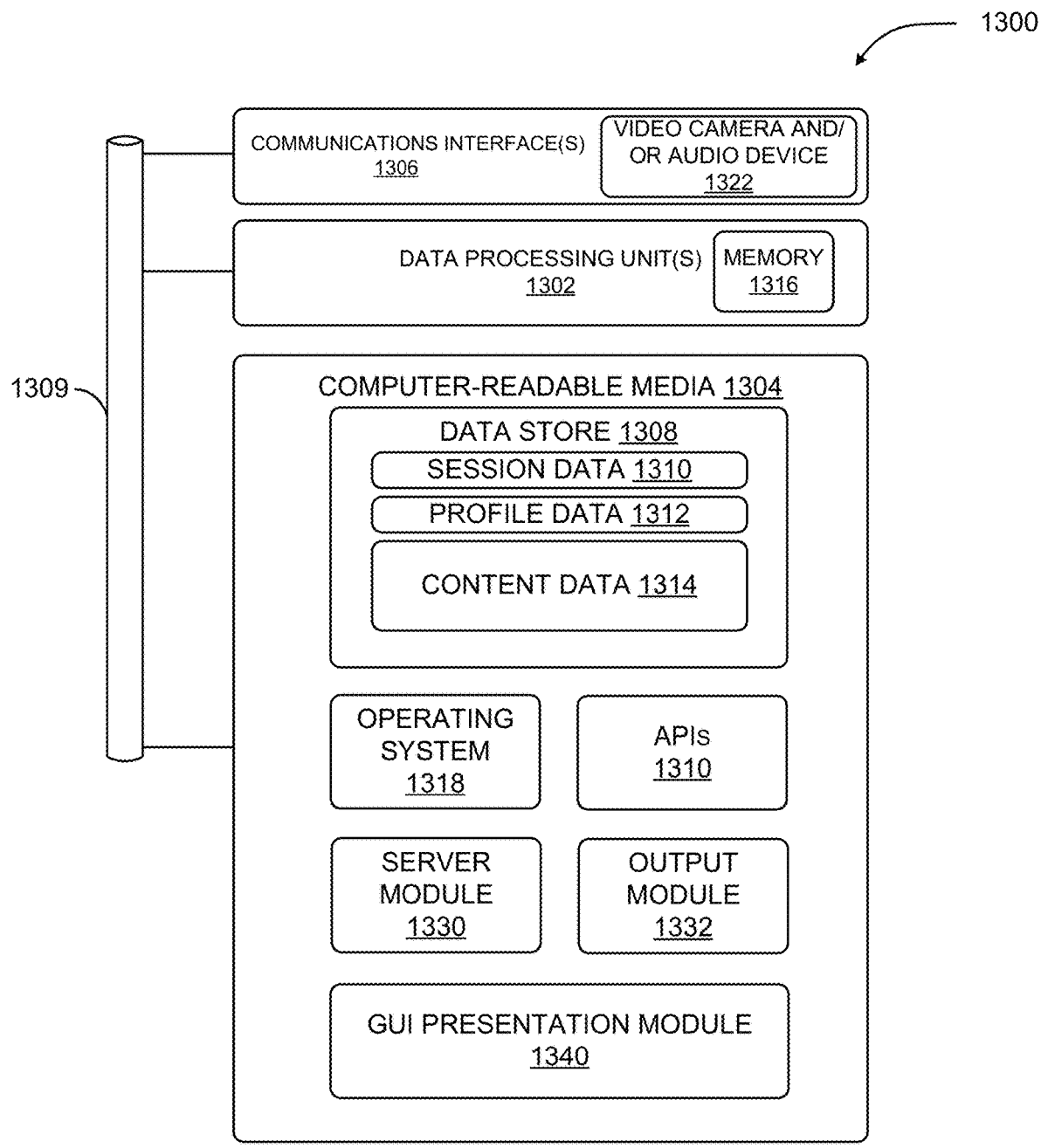
FIG. 13 is a computing architecture diagram showing aspects of the configuration and operation of a computing device that can implement aspects of the technologies disclosed herein.

FIG. 13 illustrates a diagram that shows example components of an example device 1300 (also referred to herein as a "computing device") configured to generate and process data for the user interfaces disclosed herein. The device 1300 may generate data that may include one or more display areas that may render or comprise video, images, and/or content for display on the display screen 1329. The device 1300 may represent one of the device(s) described herein. Additionally, or alternatively, the device 1300 may represent one of the client computing devices 1306.

As illustrated, the device 1300 includes one or more data processing unit(s) 1302, computer-readable media 1304, and communication interface(s) 1306. The components of the device 1300 are operatively connected, for example, via a bus 1309, which may include one or more of a system bus, a data bus, an address bus, a PCI bus, a Mini-PCI bus, and any variety of local, peripheral, and/or independent buses.

As utilized herein, data processing unit(s), such as the data processing unit(s) 1302 and/or data processing unit(s) 1392, may represent, for example, a CPU-type data processing unit, a GPU-type data processing unit, a field-programmable gate array ("FPGA"), another class of digital signal processors ("DSPs"), or other hardware logic components that may, in some instances, be driven by a CPU. For example, and without limitation, illustrative types of hardware logic components that may be utilized include Application-Specific Integrated Circuits ("ASICs"), Application-Specific Standard Products ("ASSPs"), System-on-a-Chip Systems ("SOCs"), Complex Programmable Logic Devices ("CPLDs"), etc.

As utilized herein, computer-readable media, such as computer-readable media 1304 and computer-readable media 1394, may store instructions executable by the data processing unit(s). The computer-readable media may also store instructions executable by external data processing units such as by an external CPU, an external GPU, and/or executable by an external accelerator, such as an FPGA type accelerator, a DSP type accelerator, or any other internal or external accelerator. In various examples, at least one CPU, GPU, and/or accelerator is incorporated in a computing device, while in some examples one or more of a CPU, GPU, and/or accelerator is external to a computing device.

Computer-readable media, which might also be referred to herein as a computer-readable medium, may include computer storage media and/or communication media. Computer storage media may include one or more of volatile memory, nonvolatile memory, and/or other persistent and/or auxiliary computer storage media, removable and non-removable computer storage media implemented in any method or technology for storage of information such as computer-readable instructions, data structures, program modules, or other data.

Thus, computer storage media includes tangible and/or physical forms of media included in a device and/or hardware component that is part of a device or external to a device, including but not limited to random access memory ("RAM"), static random-access memory ("SRAM"), dynamic random-access memory ("DRAM"), phase change memory ("PCM"), read-only memory ("ROM"), erasable programmable read-only memory ("EPROM"), electrically erasable programmable read-only memory ("EEPROM"), flash memory, compact disc read-only memory ("CD-ROM"), digital versatile disks ("DVDs"), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer storage media, communication media may embody computer-readable instructions, data structures, program modules, or other data in a modulated data signal, such as a carrier wave, or other transmission mechanism. As defined herein, computer storage media does not include communication media. That is, computer storage media does not include communications media consisting solely of a modulated data signal, a carrier wave, or a propagated signal, per se.

Communication interface(s) 1306 may represent, for example, network interface controllers ("NICs") or other types of transceiver devices to send and receive communications over a network. Furthermore, the communication interface(s) 1306 may include one or more video cameras and/or audio devices 1322 to enable generation of video feeds and/or still images, and so forth.

In the illustrated example, computer-readable media 1304 includes a data store 1308. In some examples, the data store 1308 includes data storage such as a database, data warehouse, or other type of structured or unstructured data storage. In some examples, the data store 1308 includes a corpus and/or a relational database with one or more tables, indices, stored procedures, and so forth to enable data access including one or more of hypertext markup language ("HTML") tables, resource description framework ("RDF") tables, web ontology language ("OWL") tables, and/or extensible markup language ("XML") tables, for example.

The data store 1308 may store data for the operations of processes, applications, components, and/or modules stored in computer-readable media 1304 and/or executed by data processing unit(s) 1302 and/or accelerator(s). For instance, in some examples, the data store 1308 may store session data 1310, profile data 1312 (e.g., associated with a participant profile), and/or other data. The session data 1310 can include a total number of participants (e.g., users and/or client computing devices) in a communication session, activity that occurs in the communication session, a list of invitees to the communication session, and/or other data related to when and how the communication session is conducted or hosted. The data store 1308 may also include content data 1314, such as the content that includes video, audio, or other content for rendering and display on one or more of the display screens 1329.

Alternately, some or all of the above-referenced data can be stored on separate memories 1316 on board one or more data processing unit(s) 1302 such as a memory on board a CPU-type processor, a GPU-type processor, an FPGA-type accelerator, a DSP-type accelerator, and/or another accelerator. In this example, the computer-readable media 1304 also includes an operating system 1318 and application programming interface(s) 1310 (APIs) configured to expose the functionality and the data of the device 1300 to other devices. Additionally, the computer-readable media 1304 includes one or more modules such as the server module 1330, the output module 1332, and the GUI presentation module 1340, although the number of illustrated modules is just an example, and the number may vary higher or lower. That is, functionality described herein in association with the illustrated modules may be performed by a fewer number of modules or a larger number of modules on one device or spread across multiple devices.

It is to be appreciated that conditional language used herein such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example. Conjunctive language such as the phrase "at least one of X, Y or Z," unless specifically stated otherwise, is to be understood to present that an item, term, etc. may be either X, Y, or Z, or a combination thereof.

It should also be appreciated that many variations and modifications may be made to the above-described examples, the elements of which are to be understood as being among other acceptable examples. All such modifications and variations are intended to be included herein within the scope of this disclosure and protected by the following claims.

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

What is claimed is:

1. A method for execution to be performed by a data processing system,
   the method comprising:
   causing a display of a user interface (UI) on a display device, the UI comprising a plurality of display areas, individual display areas of the plurality of display areas configured to display renderings of content;
   receiving a user input requesting to make a selected one of the plurality of display areas stationary within a primary display area of the UI;
   responsive to receiving the user input, configuring the selected one of the plurality of display areas such that it remains stationary within the primary display area of the UI;
   storing a view template comprising data defining an arrangement of the display areas in the primary display area in response to configuring the selected one of the plurality of the display areas as stationary; and
   processing the view template in association with an occurrence of a recurring communication session to render the arrangement of the display areas, including the selected one of the plurality of display areas configured to be stationary within the primary display area of the UI, during the occurrence of the recurring communication session.

2. The method of claim 1, further comprising transmitting the view template to one or more other data processing systems, whereby the one or more other data processing systems process the view template to render the arrangement of the display areas.

3. The method of claim 2, wherein at least one of the one or more other data processing systems is configured to render a subset of the plurality of display areas, the subset of the plurality of display areas selected based upon permissions associated with a user of the at least one or more other data processing systems.

4. The method of claim 2, wherein at least one of the one or more other data processing systems is configured to prevent modification of the arrangement of the display areas based upon permissions associated with a user of the at least one or more other data processing systems.

5. The method of claim 1, further comprising:
   receiving view usage data describing an arrangement of display areas presented by one or more other data processing systems during the occurrence of the recurring communication session; and
   storing a second view template, the second view template comprising data defining an arrangement of display areas selected based upon the view usage data.

6. The method of claim 1, wherein the data defining the arrangement of the display areas in the primary display area comprises data defining locations of the plurality of display areas, data identifying content associated with the plurality of display areas, and data indicating whether the plurality of display areas are stationary within the primary display area.

7. The method of claim 1, wherein the view template further comprises data identifying one or more users authorized to use the view template to render the arrangement of the display areas.

8. A system, comprising:

means for causing a display of a user interface (UI) on a display device, the UI comprising a plurality of display areas, individual display areas of the plurality of display areas configured to display renderings of content associated with a first communication session;

means for receiving a user input requesting to make a selected one of the plurality of display areas stationary within a primary display area of the UI;

means for configuring the selected one of the plurality of display areas such that it remains stationary within the primary display area of the UI responsive to receiving the user input;

means for storing a view template comprising data defining an arrangement of the display areas in the primary display area in response to configuring the selected one of the plurality of the display areas as stationary; and means for processing the view template in association with a second communication session to render the arrangement of the display areas including the selected one of the plurality of display areas configured to be stationary within the primary display area of the UI during the second communication session, wherein the second communication session comprises an occurrence of a recurring communication session.

9. The system of claim 8, further comprising means for transmitting the view template to one or more other data processing systems, whereby the one or more other data processing systems process the view template to render the arrangement of the display areas.

10. The system of claim 9, wherein at least one of the one or more other data processing systems is configured to render a subset of the plurality of display areas, the subset of the plurality of display areas selected based upon permissions associated with a user of the at least one or more other data processing systems.

11. The system of claim 9, wherein at least one of the one or more other data processing systems is configured to prevent modification of the arrangement of the display areas based upon permissions associated with a user of the at least one or more other data processing systems.

12. The system of claim 8, further comprising:

receiving view usage data describing an arrangement of display areas presented by one or more other data processing systems during the first communication session; and storing a second view template, the second view template comprising data defining an arrangement of display areas selected based upon the view usage data.

13. The system of claim 8, wherein the data defining the arrangement of the display areas in the primary display area comprises data defining locations of the plurality of display areas, data identifying content associated with the plurality of display areas, and data indicating whether the plurality of display areas are stationary within the primary display area.

* * * * *